(12) United States Patent
Zucker et al.

(10) Patent No.: US 8,791,788 B2
(45) Date of Patent: Jul. 29, 2014

(54) ELECTRONIC BOOK SECURITY FEATURES

(75) Inventors: Arnold Zucker, Hashmonaim (IL);
Perry Smith, Maale Adumim (IL); Yossi Tsuria, Jerusalem (IL); Harel Cain, Jerusalem (IL); Hillel Solow, Beit Shemesh (IL); Steve Epstein, Hashmonaim (IL); Shabtai Atlow, Efrat (IL)

(73) Assignee: Cisco Technology Inc., San Jose, CA (US)

( * ) Notice: Subject to any disclaimer, the term of this patent is extended or adjusted under 35 U.S.C. 154(b) by 175 days.

(21) Appl. No.: 13/384,687

(22) PCT Filed: Jun. 21, 2010

(86) PCT No.: PCT/IB2010/052784
§ 371 (c)(1),
(2), (4) Date: Feb. 14, 2012

(87) PCT Pub. No.: WO2011/021114
PCT Pub. Date: Feb. 24, 2011

(65) Prior Publication Data
US 2012/0139693 A1    Jun. 7, 2012

Related U.S. Application Data

(60) Provisional application No. 61/274,715, filed on Aug. 20, 2009.

(51) Int. Cl.
*H04B 3/00* (2006.01)
(52) U.S. Cl.
USPC .......................................................... 340/5.2
(58) Field of Classification Search
USPC .................. 340/5.2, 3.1, 5.8; 382/232, 277
See application file for complete search history.

(56) References Cited

U.S. PATENT DOCUMENTS

| 5,018,767 A | 5/1991 | Wicker |
| 5,197,765 A | 3/1993 | Mowry, Jr. et al. |

(Continued)

FOREIGN PATENT DOCUMENTS

| EP | 1 349 370 A2 | 10/2003 |
| JP | 02-178763 | 7/1990 |

(Continued)

OTHER PUBLICATIONS

Kisik Chang et al., "High Quality perceptual Steganographic Techniques," (Lecture Notes in Computer Science 2939, pp. 518-531) (Springer-Verlag 2004).

*Primary Examiner* — Vernal Brown
(74) *Attorney, Agent, or Firm* — Husch Blackwell LLP

(57) ABSTRACT

A method and system for fingerprinting a content item is described, the content item including a set of content item elements E, providing information uniquely associated with a single user including a string of bits $S_0$, parsing $S_0$ into a plurality of substrings which are functions of $S_0$, providing a matrix of content item replacement elements, each row of which includes, for each member of E, an array of content item replacement elements for $E_i$, uniquely associating each substring of $S_0$ so that for every substring there exists a corresponding element of E, for every substring, replacing at least one instance of the corresponding element E in the content item with one substitute matrix element for the corresponding substring, and outputting a replacement content item including the result of the replacing, the substitute matrix elements being chosen according to at least one similarity criterion.

16 Claims, 15 Drawing Sheets

(56) References Cited

U.S. PATENT DOCUMENTS

| | | |
|---|---|---|
| 5,757,916 A | 5/1998 | MacDoran et al. |
| 5,778,304 A | 7/1998 | Grube et al. |
| 5,842,023 A | 11/1998 | Tsumura |
| 5,853,197 A | 12/1998 | Mowry, Jr. et al. |
| 5,887,269 A | 3/1999 | Brunts et al. |
| 5,972,546 A | 10/1999 | Bjelkhagen |
| 5,982,897 A | 11/1999 | Clark |
| 6,008,727 A | 12/1999 | Want et al. |
| 6,009,116 A | 12/1999 | Bednarek et al. |
| 6,094,483 A | 7/2000 | Fridrich et al. |
| 6,154,172 A | 11/2000 | Piccionelli et al. |
| 6,195,698 B1 | 2/2001 | Lillibridge et al. |
| 6,204,764 B1 | 3/2001 | Maloney |
| 6,209,922 B1 | 4/2001 | Klein |
| 6,370,629 B1 | 4/2002 | Hastings et al. |
| 6,724,920 B1 | 4/2004 | Berenz et al. |
| 7,196,822 B2 | 3/2007 | Hu |
| 7,298,851 B2 | 11/2007 | Hendricks et al. |
| 7,299,501 B2 | 11/2007 | Hendricks |
| 7,313,825 B2 | 12/2007 | Redlich et al. |
| 7,331,725 B2 | 2/2008 | Troyansky et al. |
| 7,336,841 B2 * | 2/2008 | Neogi ............................ 382/245 |
| 7,505,946 B2 | 3/2009 | Chellapilla et al. |
| 7,512,978 B1 | 3/2009 | Screen et al. |
| 7,542,625 B2 | 6/2009 | Manber et al. |
| 2002/0040472 A1 | 4/2002 | Hendricks |
| 2004/0189682 A1 | 9/2004 | Troyansky et al. |
| 2005/0117776 A1 | 6/2005 | Powell et al. |
| 2005/0154891 A1 | 7/2005 | Skipper |
| 2005/0258234 A1 | 11/2005 | Silverbrook et al. |
| 2006/0197672 A1 | 9/2006 | Talamas, Jr. et al. |
| 2006/0284411 A1 | 12/2006 | Wu |
| 2007/0201702 A1 | 8/2007 | Hendricks et al. |
| 2008/0019559 A1 | 1/2008 | Wang et al. |
| 2008/0130940 A1 | 6/2008 | Whitelaw |
| 2009/0024661 A1 | 1/2009 | Kelliher |
| 2009/0171750 A1 | 7/2009 | Zhou et al. |
| 2009/0171751 A1 | 7/2009 | Zhou et al. |

FOREIGN PATENT DOCUMENTS

| | | |
|---|---|---|
| JP | 2004-302913 | 10/2004 |
| WO | WO 98/08344 | 2/1998 |
| WO | WO 99/45491 | 9/1999 |
| WO | WO 2006/042460 A1 | 4/2006 |
| WO | WO 2009/150394 A2 | 12/2009 |

* cited by examiner

ELECTRONIC BOOK SECURITY FEATURES

RELATED APPLICATION INFORMATION

The present application is a 35 USC §371 application of PCT/IB2010/052784, filed on 21 Jun. 2010, and entitled "Electronic Book Sevurity Features", which was published in the English language with International Publication Number WO 2011/021114, and which claims the benefit of priority from U.S. provisional application No. 61/274,715 of Arnold Zucker, et al., filed 20 Aug. 2009, the disclosure of which is hereby incorporated herein by reference.

BACKGROUND OF THE INVENTION

The following references are believed to reflect the state of the art:
US 20050154891 of Skipper;
US 20050258234 of Silverbrook, et al.;
U.S. Pat. No. 7,313,825 to Redlich, et al.;
U.S. Pat. No. 6,094,483 to Fridrich, et al.;
U.S. Pat. No. 5,982,897 to Clark;
U.S. Pat. No. 6,370,629 to Hastings;
U.S. Pat. No. 6,154,172 to Piccionelli;
U.S. Pat. No. 5,887,269 to Brunts;
U.S. Pat. No. 5,842,023 to Tsumura;
U.S. Pat. No. 5,778,304 to Grube;
U.S. Pat. No. 5,757,916 to MacDoran;
US 2009024661 of Kelliher;
JP 2004302913 of Kokuyo Co., Ltd.;
U.S. Pat. No. 6,008,727 of Want, et al.;
WO 09150394 to De La Rue International, Ltd.;
U.S. Pat. No. 7,331,725 of Troyansky et al.;
U.S. Pat. No. 6,204,764 of Maloney;
US 2006197672 of Talamas Jr., et al.;
WO 99/045491 of Nuvomedia Inc.;
WO 98/08344 of The Virtual Press;
U.S. Pat. No. 7,298,851 to Hendricks, et al.;
U.S. Pat. No. 7,299,501 to Hendricks, et al.;
U.S. Pat. No. 7,542,625 to Manber, et al.;
US 20020040472 of Hendricks, et al.;
US 20070201702 of Hendricks, et al;
US 20090171750 of Zhou, et al.; and
US 20090171751 of Zhou, et al.
JP 02-178763 (published 11 Jul. 1990, Applicant Seikosha Co. Ltd., Inventors Keiichi et al.);
U.S. Pat. No. 6,009,116 to Bednarek, et al.;
U.S. Pat. No. 6,724,920 to Berenz, et al.;
US 2008130904 of Whitelaw;
U.S. Pat. No. 7,196,822 to Hu;
U.S. Pat. No. 7,512,978 to Screen, et al.;
U.S. Pat. No. 5,972,546 to Bjelkhagen;
US 2006284411 to Wu;
U.S. Pat. No. 7,505,946 to Chellapilla, et ;
U.S. Pat. No. 6,195,698 to Lillibridge, et al.;
U.S. Pat. No. 5,197,765 to Mowry, Jr. et al.;
U.S. Pat. No. 5,018,767 to Wicker;
U.S. Pat. No. 5,853,197 to Mowry, Jr. et al.;
U.S. Pat. No. 6,209,922 to Klein;
US 20080019559 of Wang et al.; and
WO 2006/042460 of Liu.

SUMMARY OF THE INVENTION

There is thus provided in accordance with an embodiment of the present invention an e-Reader constructed and operative for protecting content and displaying protected content.

Accordingly, there is thus provided in accordance with an embodiment of the present invention a method for fingerprinting a content item, the method including providing the content item, the content item including a set of content item elements, the set of content item elements denoted E, such that $E = \{E_1, E_2, \ldots E_i, \ldots E_m\}$, providing information uniquely associated with a single user, the information including a string of bits, hereinafter denoted $S_0$, parsing $S_0$ into a plurality of subsequences of strings of bits, hereinafter denoted $S_1, \ldots, S_n$, the parsing being performed such that $S_0$ equals a function of $S_1, \ldots, S_n$, providing a matrix of content item replacement elements, the matrix denoted R, each row of matrix R including, for at least each one of n members of set E, an array of content item replacement elements for $E_i$ denoted $R_i$, such that $R_i = \{R_{i1}, \ldots R_{ij}\}$, uniquely associating each one of $S_1, \ldots, S_n$ with one matrix element of matrix R, so that for every one of $S_1, \ldots, S_n$ there exists a corresponding element of E, for every one of $S_1, \ldots, S_n$ replacing at least one instance of the corresponding element E in the content item with the associated one matrix element of matrix R for the corresponding one of $S_1, \ldots, S_n$, and outputting a replacement content item including the result of the replacing, wherein the members of $R_i$ for each $E_i$ are chosen according to at least one similarity criterion.

Further in accordance with an embodiment of the present invention and also including storing a record indicating which matrix element of matrix R replaces which subsequence of $S_1, \ldots, S_n$.

Still further in accordance with an embodiment of the present invention the choosing according to a similarity criterion includes choosing from a table.

Additionally in accordance with an embodiment of the present invention the table includes a plurality of Unicode characters.

Moreover in accordance with an embodiment of the present invention the table includes a plurality of colors.

Further in accordance with an embodiment of the present invention the table includes a plurality of gray scale levels.

Still further in accordance with an embodiment of the present invention the content item includes a text based content item.

Additionally in accordance with an embodiment of the present invention the $E_i$ included in the text based content item includes a Unicode character.

Moreover in accordance with an embodiment of the present invention the $E_i$ included in the text based content item includes at least one pixel displayed in one character.

Further in accordance with an embodiment of the present invention the content item includes a graphic content item.

Still further in accordance with an embodiment of the present invention the $E_i$ included in the graphic content item includes at least one pixel.

Additionally in accordance with an embodiment of the present invention the content item includes a sound based content item.

Moreover in accordance with an embodiment of the present invention the content item includes a video based content item.

Further in accordance with an embodiment of the present invention the $E_i$ included in the video based content item includes at least one pixel.

There is also provided in accordance with another embodiment of the present invention a system for fingerprinting a content item, the system including a content item including a set of content item elements, the set of content item elements denoted E, such that $E = \{E_1, E_2, \ldots E_i, \ldots E_m\}$, information uniquely associated with a single user, the information including a string of bits, hereinafter denoted $S_0$, a parser operative to parse $S_0$ into a plurality of subsequences of strings of bits, hereinafter denoted $S_1, \ldots, S_n$, the parsing being performed such that $S_0$ equals a function of $S_1, \ldots, S_n$, a matrix of content item replacement elements, the matrix denoted R, each row of matrix R including, for at least each one of n members of set E, an array of content item replacement elements for $E_i$ denoted $R_i$, such that $R_i=\{R_{i1}, \ldots R_{ij}\}$, a processor which uniquely associates each one of $S_1, \ldots, S_n$ with one matrix element of matrix R, so that for every one of $S_1, \ldots, S_n$ there exists a corresponding element of E, a replacer, operative to replace, for every one of $S_1, \ldots, S_n$, at least one instance of the corresponding element E in the content item with the associated one matrix element of matrix R for corresponding one of $S_1, \ldots, S_n$, and a replacement content item outputting unit which outputs a replacement content item including the result of the replacing, wherein the members of $R_i$ for each $E_i$ are chosen according to at least one similarity criterion.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
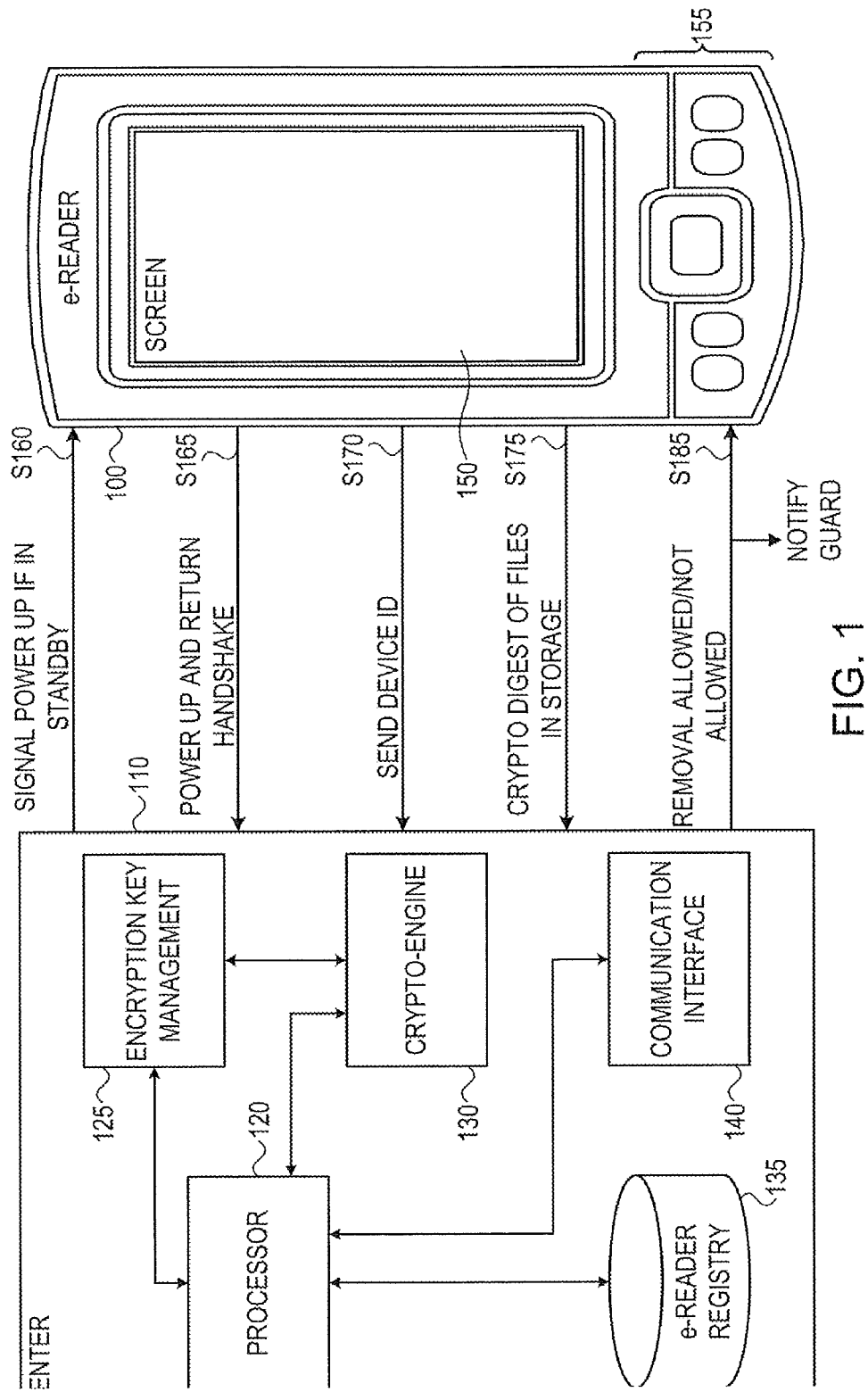
FIG. 1 is a simplified illustration of a first embodiment of a system for protecting content for display on an electronic reader (e-Reader), constructed and operative in accordance with an embodiment of the present invention.

Reference is now made to FIG. 1, which is a simplified illustration of a first embodiment of a system for protecting content for display on an electronic reader (e-Reader), constructed and operative in accordance with an embodiment of the present invention.

It is appreciated that although the specifications and claims refer to an e-Reader, the present invention may be embodied in any appropriate device, such as, but not limited to, music players; video players; memory devices (such embodiments of the present invention may not comprise rendering of content, however); and so forth.

The system of FIG. 1 comprises an e-Reader 100 and a "center" 110. The center 110 comprises some of a processor 120, an encryption key management system 125, a crypto-engine 130, an e-Reader registry 135, a communication interface, and other standard components well known in the art. It is appreciated that the center may be comprised in a plurality of different devices. Additionally, components comprised in the center may be comprised in hardware, software, or a combination of hardware and software, as is well known in the art.

The e-Reader 100 comprises a reading screen 150, manually actuated controls 155, and software and hardware, as is well known in the art. Those skilled in the art will appreciate that instead or in addition to the manually actuated controls 155 the e-Reader 100 reading screen 150 may comprise a touch screen which is operative to serve as a user interface for user command input, as is known in the art. The e-Reader 100 further comprises storage, an encryption key management system, and a crypto-engine.

The e-Reader 100 is in communication with the center 110. Any appropriate communication protocol may be utilized for the communication between the e-Reader 100 and the center 110. For example and without limiting the generality of the foregoing, communication between the e-Reader 100 and the center 110 may be via wireless TCP/IP communication, via wired TCP/IP communication, via a cellular telephone network, or via Bluetooth communication. Additionally, one way communication systems, such as satellite broadcasting and terrestrial broadcasting systems may provide communication between a remote center 110 and the e-Reader 100.

The center 110 typically has access to a software process running on the e-Reader 100. The process has been granted at least read/write permission for files stored on the e-Reader 100 by an operating system which is resident on the e-Reader 100. By way of abstraction, the center itself may be referred to as having at least read/write permission. Alternatively, files comprised on the e-Reader 100 may be of two categories. Files of a first category comprise files which are controlled by the center 110. For such files, the software process to which the center 110 has access has read/write permission, and the e-Reader 100 has either read permission or no permission at all. Files of a second category comprise files which are controlled by the e-Reader 100 itself. For such files, the e-Reader 100 has read/write permission, and the software process to which the center 110 has access has read permission. A user of the e-Reader 100 has at least read permission for files stored on the e-Reader 100. In some implementations of the present invention the user of the e-Reader 100 also has write permission for files of the second category stored on the e-Reader 100. In some embodiments of the present invention the center 110 only has read permission for files stored on the e-Reader 100. However, the center 110 will track and monitor the e-Reader 100, and take steps necessary to protect security breaches involving the e-Reader 100, as described herein.

Figure 2:
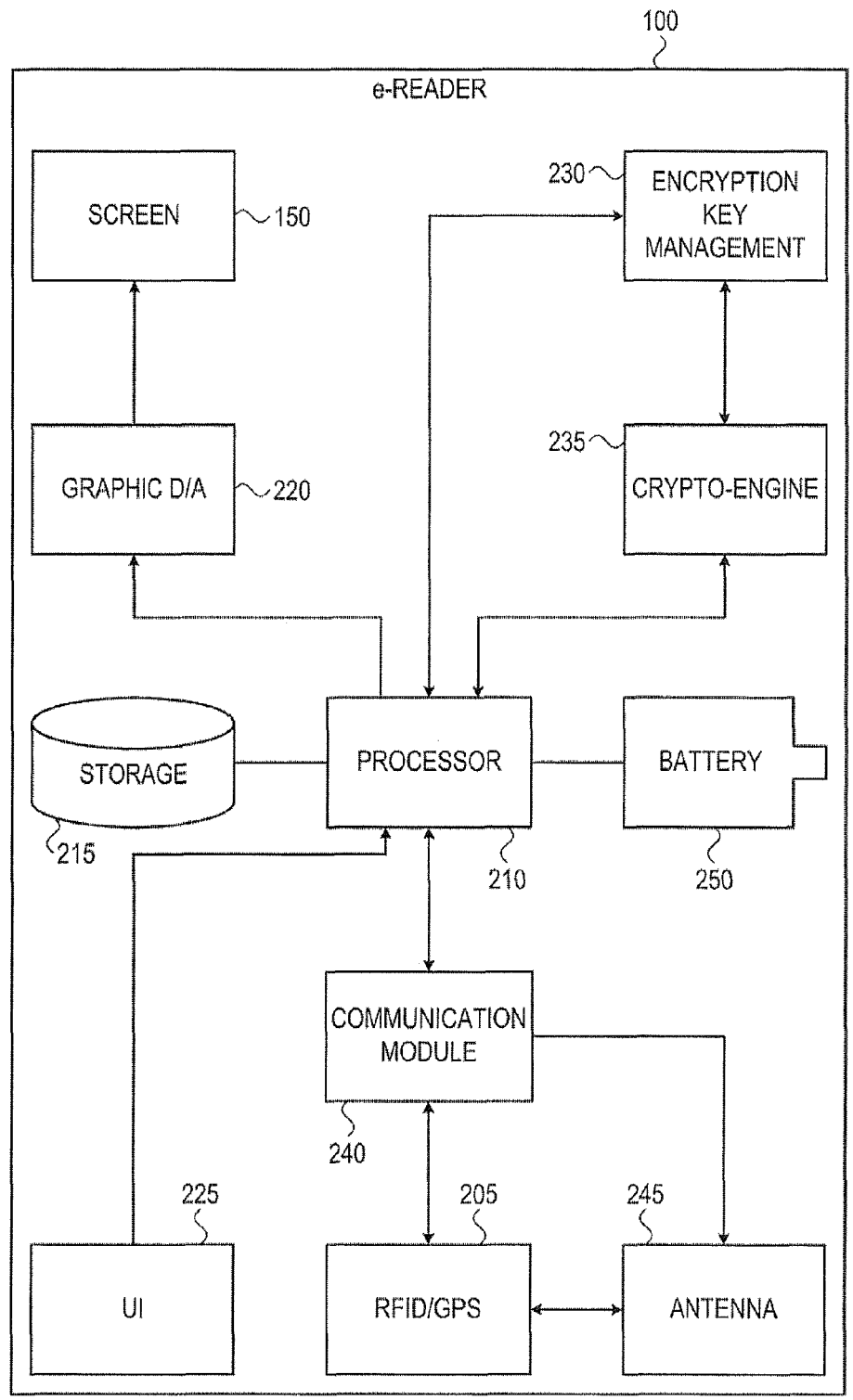
FIG. 2 is a simplified depiction of an e-Reader of the system of FIG. 1.

Reference is now additionally made to FIG. 2, which is a simplified depiction of an e-Reader 100 of the system of FIG. 1. The e-Reader 100 comprises an RFID tag 205, a GPS system, or other marker which can identify and track an object (for ease of description, hereinafter referred to as the RFID tag 205). Typically, the e-Reader 100 is in the possession of a user for use in a place of work or other premises where security is a concern. In such premises, there is typically a human guard posted at each exit. For ease of description, it will be assumed that there is only one exit. At least one function of the human guard is to prevent the removal of items which may cause security risks or leaks, such as content stored on the e-Reader 100 which might comprise content which may cause security risks or leaks. Thus, one of the duties of the human guard is to prevent the removal of the e-Reader 100 from the premises where security is a concern. Alternatively, a system may be in place whereby the content on the e-Reader 100 is either deleted or rendered not decryptable when an attempt is made to remove the e-Reader 100 from the premises or from a zone of the premises where reading secure content is allowed to a zone of the premises where reading secure content is not allowed (see below).

The e-Reader 100 typically comprises an e-Reader processor 210. The e-Reader processor 210 is operatively connected, as is known in the art, with an e-Reader storage 215, which stores files (such as, but not limited to, files for reading or viewing on the e-Reader 100, operating system files, program files, etc.). The e-Reader processor 210 outputs digital versions of text, video, and so forth, to a graphic digital to analog converter 220, which in turn, outputs analog images on the e-Reader 100 screen 150. The e-Reader processor 210 is further operative to receive and process input from a user interface 225, such as the manually actuated controls 155 (FIG. 1) or the reading screen 150 (FIG. 1), in cases where the reading screen 150 comprises a touch screen which is operative to serve as a user interface, as was noted above.

The e-Reader 100 further comprises an encryption key management system 230 and a crypto-engine 235, corresponding to the encryption key management system 125, and crypto-engine 130 of the center 110. The e-Reader encryption key management system 230 and a crypto-engine 235 are in communication with each other and the e-Reader processor 210. Those skilled in the art will appreciate that the crypto-engine 235 may be comprised within the e-Reader processor 210. The e-Reader processor 210 typically outputs communications to the center via a communication module 240, which is operatively connected to an antenna 245. Depending on protocol and other concerns, such as deciding with which type of marker system (e.g. GPS, RFID, etc.) to communicate, the communication module 240 may intermediate communications signals between the RFID tag 205, the GPS system, or other marker which can identify and track an object and the e-Reader processor 210. The communication module 240 and the RFID tag 205 are typically associated with at least one antenna 245. Those skilled in the art will appreciate that decisions concerning with which type of marker system to communicate, may involve load balancing, as some communication channels may be busier than others.

Additionally, the e-Reader 100 typically comprises a battery 250, which is at least partially controlled and/or monitored by the e-Reader processor 210, in order to apply, where needed, power saving and power-monitoring applications.

Returning now to the explanation of FIG. 1, it is appreciated that in some embodiments of the present invention, an element of the e-Reader 100 must remain active in the e-Reader 100 and report back to the center 110 at short periodic intervals. For example and without limiting the generality of the foregoing, the RFID tag 205 may be required to report back to the center 110 every 5, 10, or more seconds. It is appreciated that the frequency of reporting back may be a function of the proximity of the e-Reader 100 to the exit of the premises. Typically, the closer the e-Reader 100 is to the exit, the more frequently the e-Reader 100 is required to report back. It is appreciated that it may not be practical to ensure that the element of the e-Reader 100 must remain active in the e-Reader 100 under all circumstances. Thus, the element of the e-Reader 100 must remain active in the e-Reader 100 under normal operating parameters (for example and without limiting the generality of the foregoing, the battery is not removed).

In some embodiments of the present invention, if the RFID tag 205 fails to report back to the center 110, and is turned off or removed, the e-Reader 100 may no longer operate without a partial or full software reload. Alternatively, the crypt-engine 130 may not decrypt encrypted content if the RFID tag 205 fails to report back to the center 110, and is turned off or removed.

The center 110 broadcasts a signal to any e-Reader 100 in the vicinity of the exit (S160). The signal comprises an instruction to the e-Reader 100 to turn on if it is in standby, and to identify itself. In response to receipt of the signal (S160), the e-Reader 100 powers up (if it was in standby mode) and returns a handshake (S165), thereby establishing communications with the center 110. In some embodiments of the present invention, the communications between the e-Reader 100 and the center 110 comprises a non-secure communications session. Alternatively, the communications between the e-Reader 100 and the center 110 comprises a secure communications session. Accordingly, the handshake returned in step S165 ensures the center 110 that the e-Reader 100 is indeed powered up, and provides a secure session key which can be used as an encryption key for the duration of the communication session. The encryption of the communication session ensures that the communication between the e-Reader 100 and the center 110 is genuine and that no eavesdroppers can view the contents of the session.

Once communications with the center 110 are established (S165), the e-Reader 100 sends the center 110 a unique device ID (S170). The e-Reader 100 then further sends the center 110 a cryptographic digest of each file in the storage comprised in the e-Reader 100 (S175). The cryptographic digest may be generated in real time by the e-Reader 100, or alternatively, in order to save time, the cryptographic digest could be stored in the e-Reader 100 storage with the file itself.

It is appreciated that, in order for step S160 to operate properly, the e-Reader 100 does not enter a state of being truly powered off. Rather, attempts to power off the e-Reader 100 result in the e-Reader 100 being put into standby mode. Alternatively, the e-Reader 100 may power-off but have some dedicated component which is left on (for example and without limiting the generality of the foregoing, as is well known, in some personal computers, even when the power is off, the LAN card is still functional at a low level of functionality). Further alternatively, the e-Reader 100 may automatically turn on every few seconds or minutes to check that it is in communication with the center 110.

It is appreciated that in step S175 the cryptographic digest need not comprise all of the classic properties of a cryptographic hash, such as collision resistance, first-preimage-resistance, and second-preimage-resistance. The digest's function is to identify the file in a brief manner.

The center 110 comprises an e-Reader registry 135 which comprises a database which lists all known unique device IDs and, for each unique device ID has a collection of cryptographic digests for files which were legally (i.e. with the knowledge and consent of the center 110) copied to each e-Reader 100 device. It is appreciated that certain files, for example and without limiting the generality of the foregoing, operating system files may be marked as unclassified, and need not be checked. Alternatively, such operating system files might be checked and approved by the center 110 for removal from the premises.

Upon receipt of the cryptographic digest of each file in the storage, the center 110 compares the received hash with the database of unique device IDs and determines if the user is attempting to remove any files which are not permitted to be removed from the center (S180). It is appreciated that the user may be removing the file in an entirely innocent fashion, for instance, if the user has forgotten that the file was not deleted from the e-Reader 100 before the user attempted to leave. Alternatively, the user could be deliberately attempting to remove information from the premises which should not be removed. Additionally, should the center 110 receive a cryptographic digest of a file which is does not match any of the hashes stored in the database, the center 110 might take action as if the file should not be removed from the premises, as described below.

Should the center 110 determine that the user is attempting to remove an e-Reader 100 comprising a file which should not be removed from the premises, the center will alert the human guard (S185). Additionally and alternatively, the center 110 may also direct the e-Reader 100 to securely delete the file which is not to be removed from the premises, or to block access to the file which is not to be removed from the premises in any appropriate fashion (move the file to a directory which the user may not access; encrypt the file to a key not available to the user; and so forth).

It is appreciated that should the user of the e-Reader 100 be allowed to write files to the e-Reader 100, those files will also require registration of a cryptographic hash of the user file with the center 110. It is appreciated that in the case of registering a file written by the user on the e-Reader 100 a cryptographic hash is required instead of a weaker cryptographic digest, as in such a case, it is necessary to avoid a second-preimage-attack, whereby an innocuous file would be registered with the center 110, and a secret file would be stored instead of the innocuous file.

It is appreciated that the user might attempt to tamper with the e-Reader 100 hardware. In such an event, a plurality of methods might be used, individually or together, to detect the attempt to tamper:

An indelible, permanent ink can be put inside the cover of the e-Reader 100 such that tampering with the e-Reader causes the hands of the tamperer to be squirted with the ink;

A label can be placed over two opposing sides of the e-Reader 100 such that tampering with the e-Reader 100 causes the label to tear. The user of the e-Reader 100 might be required to display the two opposing sides of the e-Reader 100 to the human guard at intervals.

A second RFID tag can be embedded in a hidden location in the e-Reader 100 such that, if a first RFID tag is removed, the control center is aware that only one of two RFID tags report.

Operating system files can be stored in ROM in the processor (such as a CPU) comprised in the e-Reader 100, thereby making the operating systems harder to tamper with.

The e-Reader 100 cover is itself a part of an electrical circuit comprised in the e-Reader 100. If the cover is opened in an unauthorized fashion, the circuit comprising the cover would be broken, rendering the e-Reader 100 inoperable.

Figure 3:
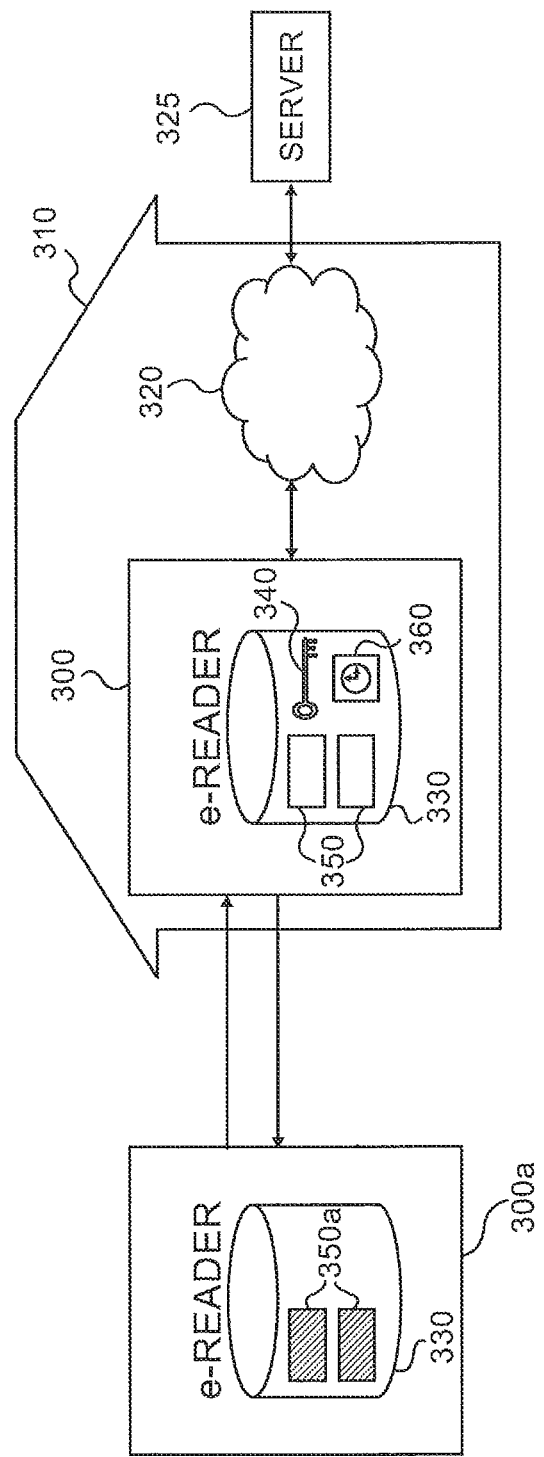
FIG. 3 is a simplified illustration of another embodiment of a system for protecting content for display on an e-Reader, constructed and operative in accordance with an embodiment of the present invention.

Reference is now made to FIG. 3, which is a simplified illustration of another embodiment of a system for protecting content for display on an e-Reader, constructed and operative in accordance with an embodiment of the present invention.

FIG. 3 depicts an e-Reader 300 while inside the premises 310 referred to above, with reference to FIG. 1. The premises 310 are depicted as comprising a communications network 320. As described above, the communications network 320 may be a wireless TCP/IP network, a Bluetooth communication network, or any other appropriate communication network over which the e-Reader 300 is in communication with a server 325. Although depicted in FIG. 3 as being outside the premises 310, it is appreciated that the server 325 need not actually be physically outside the premises The e-Reader 300 of FIG. 3 comprises a storage 330, corresponding to the e-Reader storage 215 of FIG. 2. The storage 330 is depicted comprising a decryption key 340, various decrypted content items 350, and a time bound content item 360.

The decryption key 340 is only active while the e-Reader 300 is located in communication with the communication network 320. The decryption key 340 is repeatedly downloaded or renewed from the server 325 through the communication network 320 after each access of the content 350. Alternatively, the decryption key 340 is never stored in the e-Reader 300. Rather a one-time use decryption key 340 may be accessed from the server 325 after an appropriate authentication of the e-Reader 300 which includes proof of freshness (in order to avoid replay attacks).

Alternatively, instead of requiring that the e-Reader is in communication with the communication network 320, the RFID tag 205 may be used to determine that the e-Reader 300 is within the premises 310.

Still another option is for the decryption key 340 to be stored in an encrypted form, encrypted according to a second key. The decryption key could periodically be encrypted to a different version of the second key.

Alternatively, the crypto-engine 235 (FIG. 2) is operative to receive and process a content license. The content license may not be processed by the crypto-engine 235 (FIG. 2) if the secure processor 210 (FIG. 2) has been disabled. An explicit command disabling the secure processor 210 (FIG. 2) may be broadcast by the center 110 (FIG. 1) to the e-Reader 300 when the e-Reader 300 is taken out of an exit from the premises 310. Correspondingly, an explicit command enabling the secure processor may be broadcast by the center 110 (FIG. 1) to the e-Reader 300 when the e-Reader 300 is brought in to an entrance to the premises 310. Similarly and optionally, a signal may be broadcast to the e-Reader 300 upon departure from the premises 310 requiring the e-Reader 300 to delete all forms and copies of each file which is presently stored in the e-Reader 300 memory in a decrypted form.

Once the e-Reader 300*a* is no longer in the premises 310, content 350 which was previously decrypted by the decryption key 340 is now no longer decrypted 350*a*, and thus, unreadable by the e-Reader 300*a*. Once a file which comprises content 350 which was decrypted is closed, the memory which stored the decrypted content is purged of the decrypted content, using appropriate techniques well known in the art. It is appreciated that periodic polling of the e-Reader 300 occur in order to determine if the content 350 which was previously decrypted by the decryption key 340 should be deleted. It is appreciated that the period of the polling of the e-Reader 300 depends on external factors, such as the range of the communications network and so forth.

Those skilled in the art will appreciate that the server 325 may be located in the premises 310. As an additional security feature, the server 325 may be located in a locked room or otherwise secured area, as is well known in the art. Alternatively, as depicted in FIG. 3, the server may be located off-site, and in secure communication with the e-Reader 300 via the communication network 320.

Alternatively, documents may not be locally stored at all on the e-Reader 300, but rather remotely stored on the server 325. Thus, when the e-Reader 300a is no longer in communications with the communication network 320, and thus, no longer able to communicate with the server 325, such a document is no longer available.

It is also appreciated that within a single building there might be several zones corresponding to the premises described above. For example and without limiting the generality of the foregoing, in one area of the premises 310, a first group of e-Readers, associated with a first project, may be able to view encrypted content associated with the first project and a second group of e-Readers, associated with a second project, may not be able to view encrypted content associated with a first project. However, in a second area of the building, the second group of e-Readers may be able to view encrypted content associated with the second project and the first group of e-Readers may not be able to view encrypted content associated with the second project. For instance, and without limiting the generality of the foregoing, area specific wireless networking equipment can be utilized in each zone such that in each zone, a zone specific key or key stream was broadcast. The aforementioned zone specific key or key stream can also be enforced using GPS hardware in the e-Readers.

Some content may comprise a time bound content item 360. For example and without limiting the generality of the foregoing, some content may only be accessible during certain times. If the content is accessed at other times, the content may not be viewable, or if the content is viewable, only meaningless content may be displayed. Alternatively, the time bound content item 360 may be accessible only during limited fixed times, for example and without limiting the generality of the foregoing, between 10:00 AM to 5:00 PM, Monday-Friday In some embodiments of the present invention, the server 325 may comprise a secure clock. In such embodiments, if the e-Reader 300 loses communication with the server 325 (for example and without limiting the generality of the foregoing, the e-Reader 300 is taken outside of the communication network 320; or alternatively, the e-Reader 300 enters stand-by mode), without receiving a time packet from the secure clock, the e-Reader 300 might not be able to process any content restricted to a time frame which, for the e-Reader 300, still lies in the future. It is appreciated that in order to ensure that a received time packet is fresh a challenge-response based time protocol, as is known in the art, would be implemented.

In some embodiments of the present invention, the user may be required to insert a smart card into a smart card reader associated with one or both of the e-Reader 300, or the server 325 on an episodic basis. For example and without limiting the generality of the foregoing, the user may required to insert the smart card into the smart card reader at certain intervals of time, or alternatively, after displaying a certain amount of text on the e-Reader 300. It is appreciated that a contactless smart card may be used, so that, rather than insert the smart card, it may only be necessary to bring the smart card into proximity of e-Reader 300 or the server 325. Alternatively, instead of the smart card, a secure chip, a secure ID, or biometric identification may be required (for example and without limiting the generality of the foregoing, a fingerprint, a handprint, or a retinal scan). The secure chip or secure ID interface may be via USB, SD (secure device), or other appropriate interface.

Figure 4:
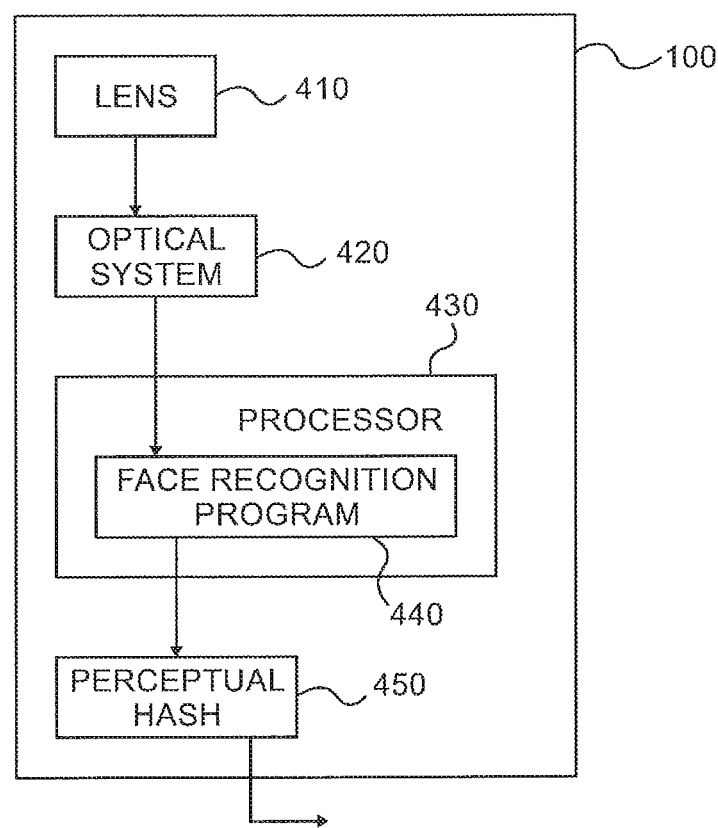
FIG. 4 is a simplified illustration of yet another embodiment of a system for protecting content for display on an e-Reader.

Reference is now made to FIG. 4, which is a simplified illustration of a yet another embodiment of a system for protecting content for display on an e-Reader. In some implementations of the present invention, the e-Reader 100, the e-Reader 100 comprises, a lens 410, an optical system 420, such as, and without limiting the generality of the foregoing, a CCD (charge-coupled device) camera, and face recognition software. When operative, the face recognition software is invoked in a face recognition processor 430 as a face recognition program 440.

Figure 5:
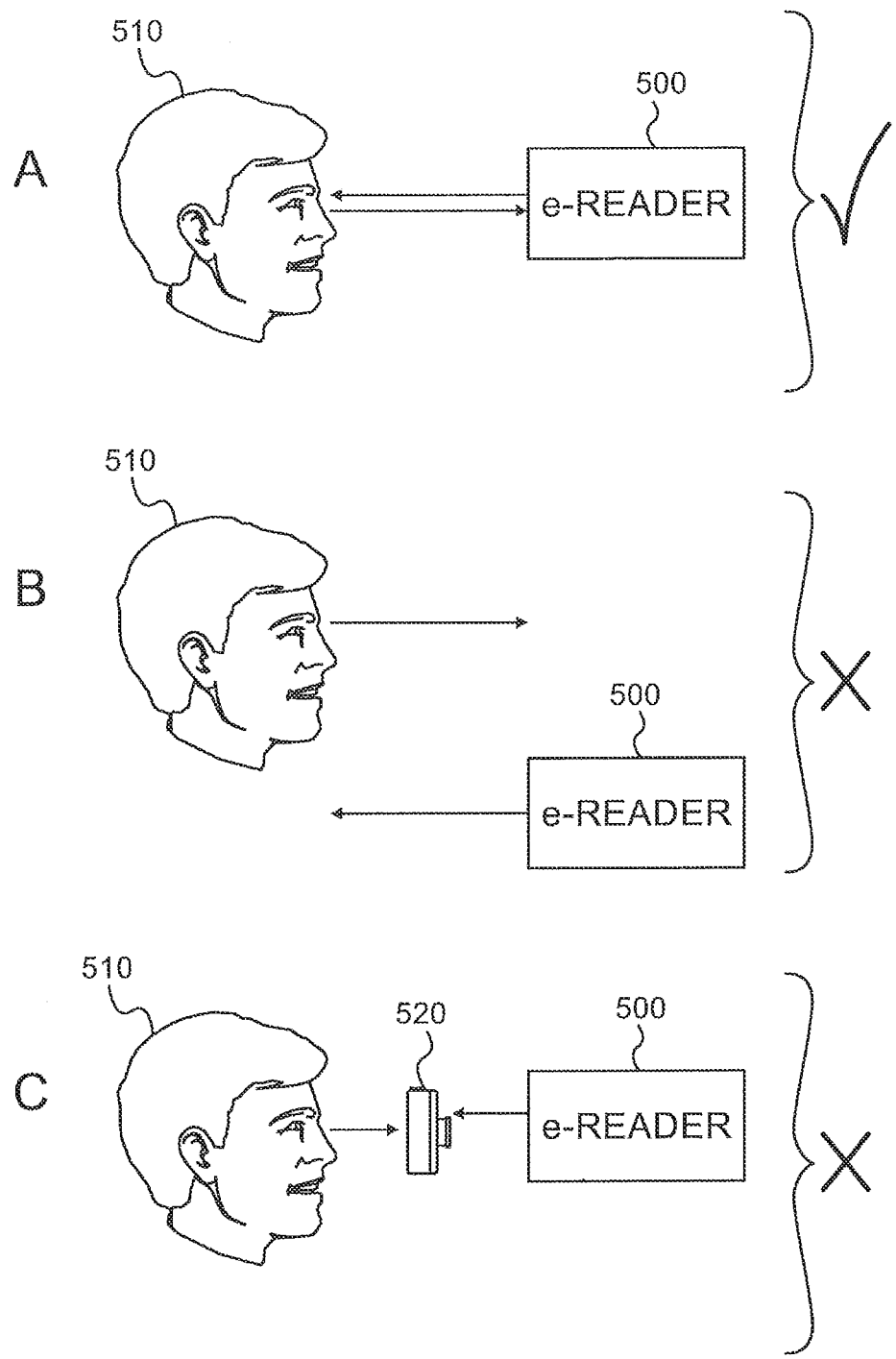
FIG. 5 is a simplified illustration of one implementation of the e-Reader depicted in FIG. 4.

Reference is now additionally made to FIG. 5, which is a simplified illustration of one implementation of the e-Reader depicted in FIG. 4. The e-Reader 100, through the lens 410 and optical system 420 episodically detects the presence of a user 510. The episodic detection of the user comprises capturing an image of whatever is directly in the line of focus of the lens, thereby producing an image. The image is processed, and further action is taken, as described below.

The face recognition program 440 may not be equipped to detect a particular face, 510 as is well known in the art. Rather, the face recognition program 440 is equipped to detect the presence of the face 510 opposite the e-reader 100, regardless of whose face the face 410 is. Alternatively, the e-Reader 100 may rely on either a retinal scan indicating the presence of the reader's eye, rather than the face recognition software or other facial recognition techniques, such as those which rely on facial geometry.

In example A, depicted in FIG. 5, the user of the e-Reader 500 is positioned so that the e-Reader 500 is opposite the face 510 of the user. A check mark indicates that in example A, the e-Reader 500 functions normally, and the user may continue to read normally.

In example B, depicted in FIG. 5, the user of the e-Reader 500 is positioned so that the e-Reader 500 is not opposite the face 510 of the user. For example, if the user attempts to scan or photocopy text which appears on the e-Reader 500, the face recognition processor 430 prevents the e-Reader 100 from functioning normally. Thus, the text no longer appears on the e-Reader 500, and thus, the text may not be scanned or photocopied. An X is depicted next to example B, in order to indicate that the e-Reader 500 does not function normally.

In example C, depicted in FIG. 5, a camera 520 or cell phone comprising a camera 520 is positioned between the e-Reader 500 and the face of the user of the e-Reader 500, so that the e-Reader 500 is not directly opposite the face 510 of the user. Thus, if the user attempts to photograph text which appears on the e-Reader 400, the face recognition processor 430 prevents the e-Reader 100 from functioning normally. Thus, the text may not be photographed. An X is depicted next to example C, in order to indicate that the e-Reader 500 does not function normally. Additionally, the e-Reader 500 software may detect the presence of the camera 520 or other imaging devices, and deny access to the content, as discussed above.

It is appreciated that in order to avoid attempts to circumvent the face recognition system described above by placing a photograph opposite the e-Reader 400, the face recognition processor 430 analyzes the image for depth of image, which would be lacking in a two dimensional image, as opposed to a face. The face recognition processor 430 is also operative, in some embodiments, to determine the presence of ocular motion on the part of the face.

Alternatively, the e-reader 500 is equipped with a gaze tracking system which uses the optical system 420 to track and monitor where the user of the e-reader 500 is looking. The e-Reader 500 then uses the gaze tracking system to determine where on the e-Reader 500 screen 150 (FIG. 1) the user of the e-Reader 500 is reading. The e-Reader 500 then distorts other portions of the e-Reader 500 screen 150 (FIG. 1). Typically, the distortion of the portions of the e-Reader 500 screen 150 (FIG. 1) is performed by pixelization, the pixelization comprising any of blurring and displaying of the portions of the e-Reader 500 screen 150 (FIG. 1) at a resolution at which reading is difficult.

In an alternative embodiment of the present invention, the e-Reader 500 may periodically photograph the face 510 of the user 510 of the e-Reader 500 and send a perceptual hash of the face 510 of user 510 to a security server (such as the server 225 of FIG. 3) in order to compare the hash of the photograph with a database of hashes of photographed faces of authorized users. Alternatively, other facial recognition techniques, such as, but not limited to, retinal matching, facial geometry matching, and so forth, may be utilized to verify that the user 510 of the e-Reader 500 is one of the authorized users.

If the hash of the photograph of the face 510 does not match a hash of a photograph of a face stored in the database of hashes of photographed faces of authorized users, security server (such as the server 225 of FIG. 3) sends a message to the e-Reader 500 instructing the e-Reader 500 to perform at least one of the following: cease displaying text; and enter standby mode. Additionally, the security server (such as the server 225 of FIG. 3) may also notify the center 110 (FIG. 1) of a potential security violation. Alternatively, the e-Reader 500 may cause files containing the displayed text to be locked either logically (with a bit so indicating) or by changing the encryption method or encryption key by which the file is encrypted, or by changing the file itself so that the file appears to be an illegal file (for instance, by changing the signature or contents of the file).

Alternatively, the photograph of the face 510 and/or the hash of the photograph may be stored on the e-Reader 500 itself or a secure ID or chip associated with the e-Reader 500. The e-Reader 500 may then securely compare the photograph of the face 510 with the stored photograph or hash. Alternatively, if the photograph of the face 510 and/or the hash of the photograph are stored on a secure ID or chip associated with the e-Reader 500, the secure ID or chip may be inserted into the e-Reader 500 or an appropriate interface proximate to the e-Reader 500 and compared with the real time image.

Those skilled in the art will appreciate that perceptual hashes are, in the present embodiment, preferred to cryptographic hashes, due to the nature of photographs of human faces. A perceptual hash is a fingerprint of a multimedia file, such as a photograph of a human face, derived from various features from the content of the multimedia file. Unlike cryptographic hash functions which rely on an avalanche effect of small changes in input leading to drastic changes in the output, perceptual hashes are "close" to one another if the features are similar. Furthermore, different photographs of the same person will yield, with high probability, the same perceptual hash values, whereas photographs of different people will yield, with high probability, different perceptual hash values. Thus, minor changes in a face on a day-to-day basis, are less likely to negatively impact the operation of the system of FIG. 5. Alternatively, any secure pattern matching software system may be used to compare the stored perceptual hash with the perceptual hash of the photograph of the face 510.

In still another alternative embodiment of the present invention, the e-Reader 500 may comprise a screen of polarized glass over a viewing screen, thereby preventing circumventing the embodiment discussed in FIG. 5 example C by taking a picture of the text displayed in the viewing screen from an angle, such that the camera 520 is not interposed between the e-Reader 500 and the face 510 of the user.

In yet another alternative embodiment of the present invention, the e-Reader 500 is only functional in the presence of one or more other e-Readers. For example and without limiting the generality of the foregoing, a student's e-Reader may only be functional in proximity to a teacher's e-Reader.

Figure 6:
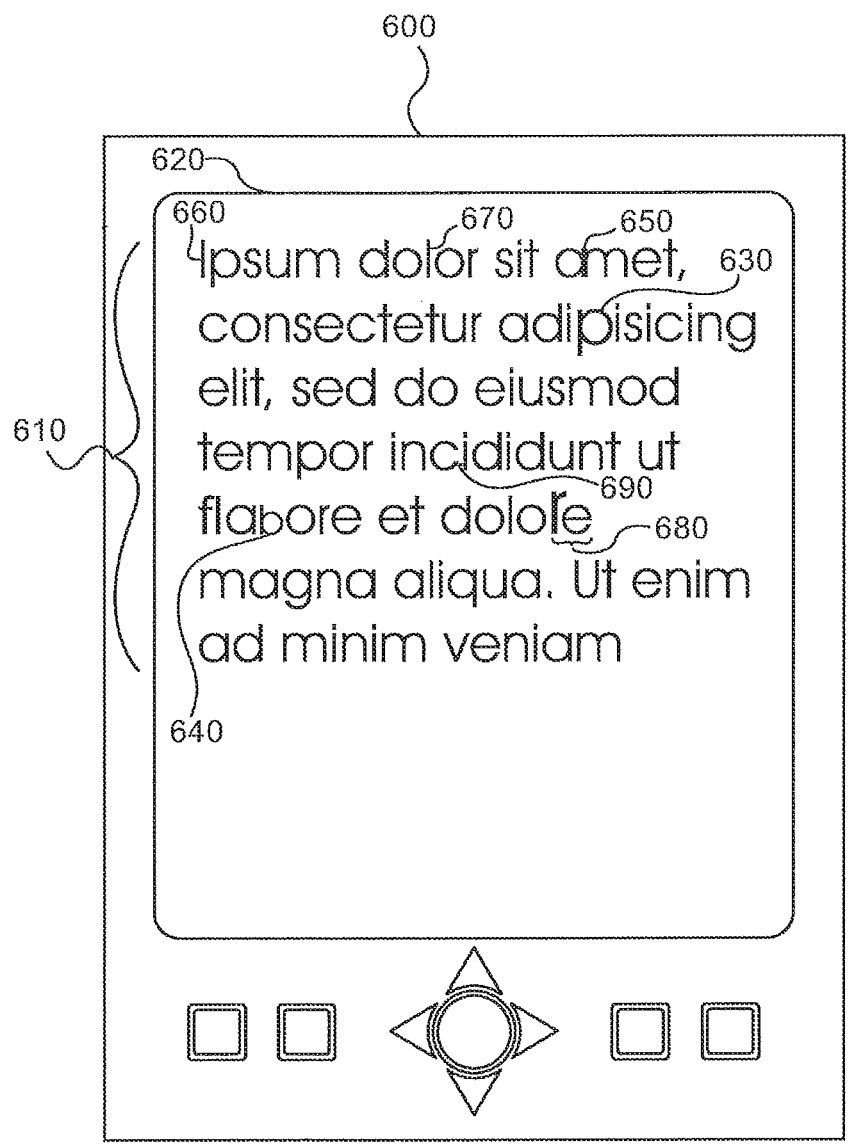
FIG. 6 is a simplified illustration of still another embodiment of a system for protecting content for display on an e-Reader.

Reference is now made to FIG. 6, which is a simplified illustration of still another embodiment of a system for protecting content for display on an e-Reader 600. A typical e-reader comprises hardware and software, as is known in the art, which is operative to display text based content on the screen 150 (FIG. 1). It is appreciated that the screen may comprise any appropriate screen including, but not limited to, LCD and eInk.

Typically, the content is rendered for display utilizing at least one font. Content which is designated as secure content is rendered using a font which comprises elements which are resistant to optical character recognition. In particular, the font utilized to render the text based content comprises modifications which render the text such that a human can still comfortably read the text, but a machine attempting OCR will introduce errors. For example and without limiting the generality of the foregoing, subtle techniques are utilized during the rendering process that will successfully introduce enough letter recognition errors, and layout errors, so as to render the OCR version of the text significantly less valuable than the original.

Those skilled in the art will appreciate that OCR resistance can be increased using a combination of varying character sizes in the same font (such as the large "p" 630 in the word "adipisicing" and the small "b" 640 in the word "flabore"), using anti-aliased characters, ensuring that the characters are displayed using abutted spacing (such as the "am" 650 in the word "amet") or extreme kerning (such as the "re" 680 in the word "dolore"), and typographical ligatures between two or more letters (such as rendering lower case "f" and lower case "l" as "fl"), ensuring that similar letters (such as upper case "I" 660 and lower case "l" 670) appear similar in appearance after rendering, and so forth. Likewise, adding additional typographical elements (such as the line 690 connecting between the "c" and the "i" in the word "incididunt") increases resistance of the font to optical character resistance.

In FIG. 6, the e-Reader 600 is depicted with text 610 on the viewing screen 620. The text 610 is displayed using a font which is resistant to optical character recognition. Thus, attempts to scan the text 610 and then perform optical character recognition on the scanned image, as is well known in the art, is thereby frustrated.

Figure 7:
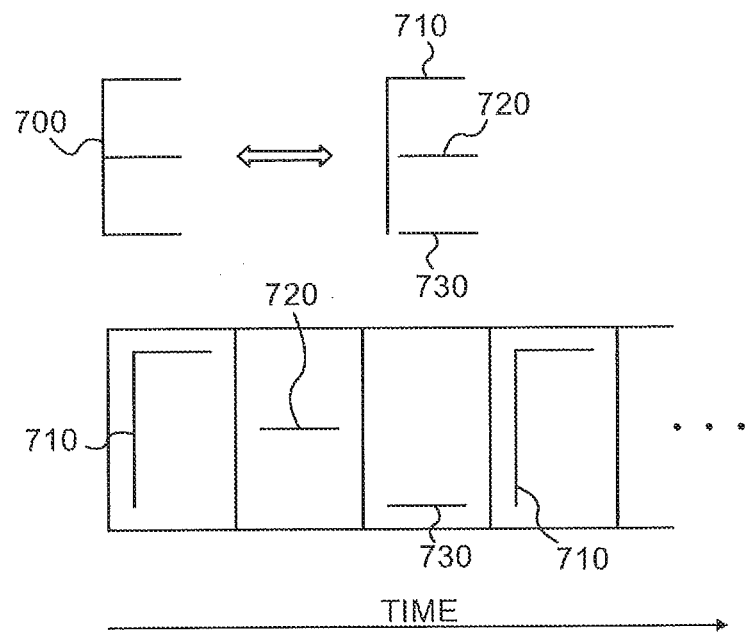
FIG. 7 is a simplified illustration of character elements being displayed on an e-Reader display, within the system of FIG. 6.

Reference is now additionally made to FIG. 7, which is a simplified illustration of character elements being displayed on an e-Reader display, within the system of FIG. 6. FIG. 7 shows a letter E 700. The letter E can be broken down into a plurality of character elements:

A first character element, similar to the Greek letter Gama Γ 710;

A second character element, corresponding to the middle bar of the letter E, -720; and A third character element, corresponding to the lower bar of the letter E, _730.

The combination of the plurality of character elements Γ 710;-720; and _730 would comprise the letter E 700. It is appreciated that the choice of the three elements selected, and not three other elements which would also combine to the letter E (for example and without limiting the generality of the foregoing, ⊢;_; and ) or the choice of using three character elements and not two character elements or four character elements is purely by way of example, and is not intended to be limiting.

For e-Reader display screens which operate at a slow enough refresh rate, displaying only some of, but not all of, the character elements on the device display screen for at least one screen refresh period would result in the character being displayed too slowly for many camera shutter speeds or scanners to capture the entire character. On the other hand, the character would appear to the human eye as being displayed in toto.

In FIG. 7, each box depicted above the time line is one displaying of one of the three character elements 710, 720, and 730 for a single screen refresh period.

If a camera has a shutter speed greater than the amount of time it would take all of the character elements to display (i.e. three consecutive boxes above the time line of FIG. 7), then the camera would not capture the entire character image. Thus, the image in the photograph would not easily lend itself to optical character recognition. For example, if the shutter speed of a camera is 1/125 second and the refresh rate of the display screen is 1/30 second, a three character element character would take 3×1/30 second to display, i.e. 1/10 second. The camera would, therefore, only be able to capture one of the character elements. In order to capture all of the three character element characters in this example the camera would have to have a shutter speed of less than 1/10 second.

Similarly, if a digital scanner is able to scan 15 pages per minute (ppm), it would therefore require 4 seconds to scan a single page. A typical A4 page is 8.27 inches in length. Thus, an A4 page would be scanned in:

8.27 inches/4 seconds =2.0675 inches/second

Assuming a font size of 12 point on average for the font displayed on the e-Reader (this varies depending on a variety of factors, including the resolution of the display screen, the material used to manufacture the display screen, and so forth), a theoretical 12 point font character which occupies the full 12 points is 0.16667 inches high.

Thus, a character of 0.16667 inches would be scanned in:

(0.16667 inches)/(2.0675 inches/second)=0.0806 seconds

A display refresh rate should be chosen such that the character elements all appear as a single letter to the human eye. Additionally, the refresh rate should be chosen so that the refresh rate is faster than the 0.0806 seconds needed to scan a character. Accordingly, a refresh rate of at least 15 Hz (0.067 seconds) should be chosen to satisfy both of these requirements. If the character is segmented into three elements, as in the present example, 3×0.067 seconds=0.20 seconds would be needed to display the entire character. Thus, scanning the entire character in 0.0806 seconds occurs too quickly in order to capture all of the character elements comprising the character, since only a single element of the character is displayed during a single screen refresh period.

The above example relates to a case where the camera or scanner is too fast to capture the entire letter E 700.

Figure 7A:
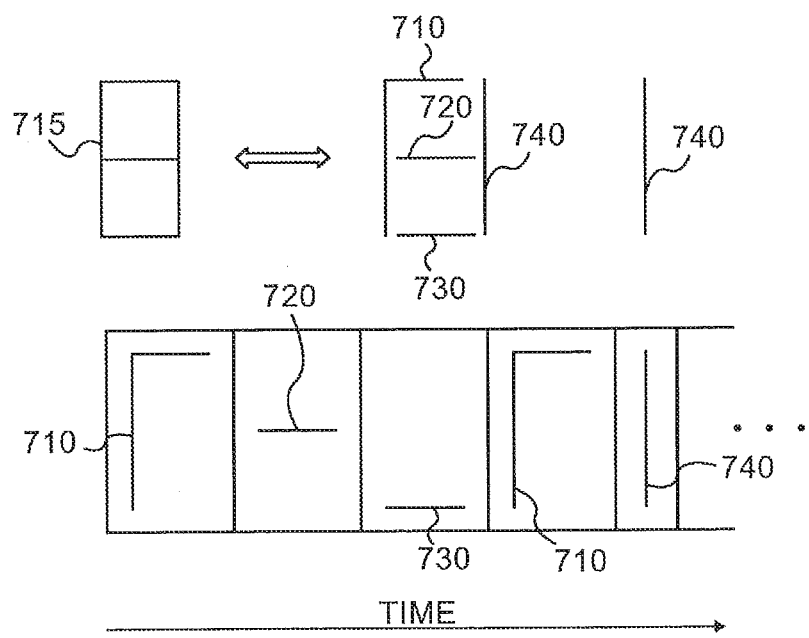
FIG. 7A is a simplified illustration of an alternative embodiment of the system depicted in FIG. 7.

In an alternative embodiment, a blocking character, such as the number 8, could be displayed very briefly thereby preventing a slow scanner or camera from recording a character correctly. Reference is now made to FIG. 7A, which is a simplified illustration of an alternative embodiment of the system depicted in FIG. 7. For example if character elements 710, 720 and 730 are each displayed for 1/15 second and blocking character element 740 is displayed for 1/60 second, which is generally faster than the human eye can register, the character E 700 would appear to the human eye as being displayed in toto correctly, while a scanner or camera would see only the character 8 715.

It is appreciated that in some embodiments, if the screen refresh rate of the viewing screen 620 is sufficiently fast, then a scanner or a camera might be too slow to capture the text displayed, if for instance the camera ISO setting is too low.

Figure 8:
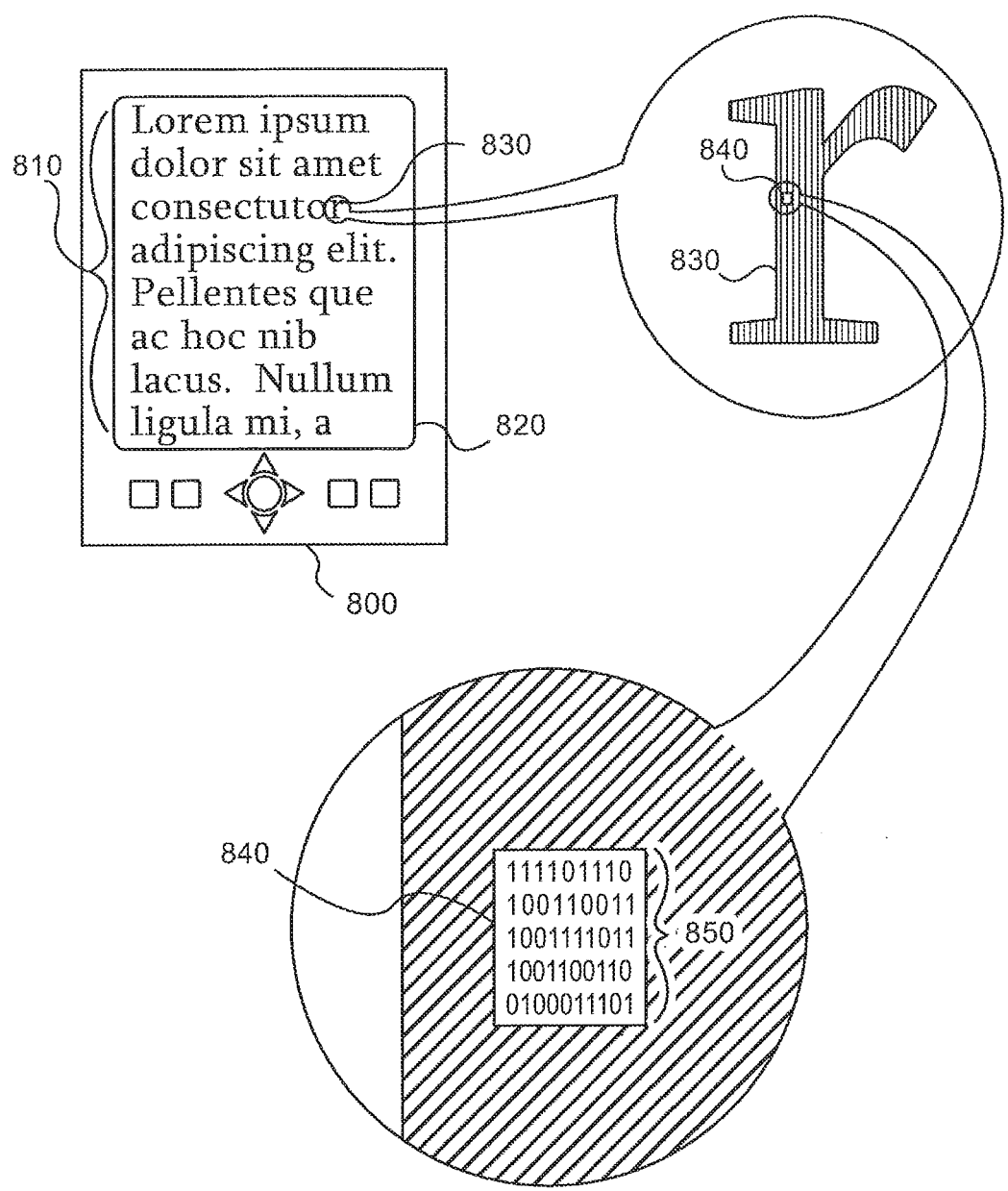
FIG. 8 is a simplified illustration of a yet another embodiment of a system for protecting content for display on an e-Reader.

Reference is now made to FIG. 8, which is a simplified illustration of yet another embodiment of a system for protecting content for display on an e-Reader 800. In FIG. 8, the e-Reader 800 is depicted with text 810 on the viewing screen 820. By way of example, the embodiment of the present invention depicted in FIG. 8 is described with reference to a single letter "r" 830 which is part of the text appearing in the viewing screen 820.

An encrypted document which is produced for distribution for reading on an e-Reader 500 may be subjected to at least one of two types of attempts to pirate the document:

1. The document decryption key may be intercepted used to decrypt the document. The decrypted document is then saved and may be redistributed. In this case, the plain text version of the decrypted document is, in principle, identical to the plain text version of the encrypted document.

2. The document may be subjected to one of photographing, scanning, and optical character recognition, in order to produce an unprotected version of the document for redistribution. A document produced in this manner is not in principle, identical to the plain text version of the encrypted document.

It is appreciated that using attack number 1, described above produces a file which, when subjected to a binary comparison with the source file will produce a nearly perfect match. On the other hand, a file produced using attack number 2 will still preserve the layout and contents of the source file, but will not produce a match when subjected to a binary comparison with the source file.

It is appreciated that once the document is saved in its plain text form, as discussed above, a photographed, scanned, or otherwise subjected to optical character recognition version of the document may then be prepared.

Aside from the methods discussed above which describe techniques for resisting optical character recognition, it is advantageous to be able to identify the source of a pirated document, once such a document is obtained.

Various watermarking and fingerprinting techniques may be applied to the production of such a document, as described below.

Typical characters, when displayed on a displaying device, such as a viewing screen are comprised of pixels. In a typical character, such as the letter "r" 830 of FIG. 8, the letter appears as a solid area, typically of a single color, often black.

However, in the embodiment of the present invention depicted in FIG. 8, the letter "r" 830 is depicted as having a small zone which is not solid, unlike the remainder of the letter "r" 830. Rather, the letter "r" comprises a small zone 840 which is not solid, but is not apparent to an eye of a viewer possessing typical visual acuity. Nonetheless, the letter "r" 830 comprises an embedded watermark 840. The embedded watermark 840 is depicted in FIG. 8 as comprising a string of zeros and ones 850, that is to say, a string of bits. A watermark comprised of a string of bits may comprise information relating to any or all of: a device ID of the e-Reader 800; a user ID of the user of the e-Reader 800; a document ID, if, for instance, the displayed text is one of a series of numbered copies of the document being read; and any other information which might be useful in identifying a potential source of a leak of the document.

For example and without limiting the generality of the foregoing, if a copy of the document is found to be illegally distributed, the embedded watermark 540 and the bits 550 comprised therein can be used to identify a potential source of a leak of the document, such as the actual e-Reader 500 device from which the document was leaked, or the user to whom the e-Reader 500 device from which the document was leaked is assigned.

In yet another alternative embodiment of the present invention, the embedded watermark 540 may comprise a microscopic or near-microscopic version of a logo or other uniquely identifying graphic element.

Returning to the discussion of the case where the document decryption key may be intercepted used to decrypt the document. As was noted above, the decrypted document is then saved and may be redistributed. In this case, the plain text version of the decrypted document is, in principle, identical to the plain text version of the encrypted document.

It is appreciated that although the discussion herein centers on text based documents, any appropriate content item, including, but not limited to text, graphics, video, and audio content may be subject to the methods described herein.

On a conceptual level, a content item may be viewed as comprising a set of elements making up the content item. This set of elements may comprise a set of:

characters for a text based content item;

pixels comprising the characters displayed in a text based content item;

pixels comprising a portion of a graphical or video based content item;

and so forth.

The set of content item elements may be denoted E, such that $E=\{E_1, E_2, \ldots E_i, \ldots E_m\}$.

Each user of the e-Reader is typically associated with some unique user information. The unique user information may comprise the user's name, or the user's user identification number, or some other information associated with the user. The unique user information is converted into a string of bits, using techniques well known in the art.

The string of bits, hereinafter denoted $S_0$, is parsed by a parser into a plurality of subsequences of strings of bits, hereinafter denoted $S_1, \ldots, S_n$, the parsing being performed such that $S_0$ equals a function of $S_1, \ldots S_n$. Examples of the parsing would be to break up a 32 bit string into 16 two bit strings. In such a case, the function may be concatenation. Alternatively, $S_1$, may be equal to the first and last bits of $S_0$; $S_2$, may be equal to the second and penultimate bits of $S_0$, and so forth.

Those skilled in the art will appreciate that the parser is typically disposed in a computer, frequently in a processor or other appropriate hardware. Alternatively, the parser is a software based parser, in which case the parser software is typically invoked by a processor.

A matrix of content replacement items is developed, the matrix denoted R, the matrix comprising at least n rows, each row of matrix R corresponding to at least one of n members of set E. There are at least n rows of R corresponding to at least one of n members of set E in order that each possible combination of subsequences of bits which may occur in $S_1, \ldots, S_n$, may be matched with a corresponding element from row $R_n$ of matrix R. (It is appreciated that in certain cases, matrix R may comprise only one row).

One element of R, $R_{ij}$ corresponding to $E_i$ and $S_j$ is replaced in the content item. The replacement of $E_i$ with $R_{ij}$ for the corresponding $S_j$ is recorded in a record stored by the computer processor performing the steps mentioned herein. The process of replacing content item elements in set E with members of matrix R is performed repeatedly, typically until at least one content item element in the content item has been replaced for each one of the subsequences of $S_1, \ldots, S_n$.

Matrix R is populated by matrix elements having a similarity criterion to the content item element to be replaced by said matrix element. The basis of the similarity criterion is that a typical user of the content item will either not notice the replacement, or if the replacement is noticeable to the typical user, the replacement will not result in a reduction of the quality of the consumption or use of the content item.

By way of example, consider a user having a unique user identification number, expressed in binary, of:

$S_0$=11010010000100101101011011

If each subsequence of $S_1, \ldots, S_n$ is to be two bits, then:
$S_1$=11
$S_2$=01
$S_3$=00
$S_4$=10
$S_5$=01
$S_6$=00
$S_7$=10
$S_8$=11
$S_9$=01
$S_{10}$=01
$S_{11}$=10
$S_{12}$=11

Examples are now provided first for video and graphic content items.

For video and graphic content items, the set E comprises a plurality of pixels, in at least one embodiment. Each pixel in a video frame or in a graphic element has a coordinate, and is typically associated with one of a color value (for color pictures) or a grey scale value (for black and white pictures). It is appreciated that various color systems are in use, including, but not limited to RGB (red-green-blue), CYMK (cyan, magenta, yellow), CIE, chrominance-luma (YUV), and so forth. For the purpose of this example, the RGB color system is used, but any color system may be used.

In the present example, where $S_0$ is divided into twelve subsequences of bits, at least twelve pixels in the content item are selected.

As was noted above, each pixel within a video frame or a graphic element has a coordinate, indicating the pixel's location. The pixel has a color value or grey scale. Additionally, each pixel in a video is located in a single frame in the video. Thus, for over all of the pixels in E, we can create the following matrix: $E_{x,y,f,R,G,B}$, where x and y indicate the coordinates at which the pixel is located in the frame/graphic. In the case of video, the frame in which the pixel is located is denoted by f. The color of the pixel is indicated by the subscripts R, G, and B.

In the present example, for ease of the present description, assume that either a single video frame or a picture is being discussed. In the case of video, a frame number would be added as well.

Thus, the following pixels might be selected for replacement:

| PIXEL and COLOR |
|---|
| (x = 127; y = 12; R = 62; G = 240; B = 197) |
| (x = 17; y = 112; R = 68; G = 240; B = 193) |
| (x = 227; y = 184; R = 97; G = 119; B = 17) |
| (x = 18; y = 96; R = 211; G = 111; B = 97) |
| (x = 107; y = 120; R = 129; G = 24; B = 19) |
| (x = 63; y = 80; R = 162; G = 20; B = 7) |
| (x = 182; y = 85; R = 112; G = 200; B = 251) |
| (x = 208; y = 1912; R = 93; G = 164; B = 227) |
| (x = 6233; y = 963; R = 18; G = 226; B = 69) |

-continued

| PIXEL and COLOR |
| --- |
| (x = 7351; y = 858; R = 243; G = 24; B = 227) |
| (x = 1327; y = 1020; R = 62; G = 245; B = 73) |
| (x = 6207; y = 412; R = 105; G = 20; B = 39) |

The following replacement table might be developed. A rule might be applied to determine how a change is performed (for example and without limiting the generality of the foregoing, if the subsequence $S_i$ is 00, increase the red value by 3; if the subsequence $S_i$ is 01, decrease the blue value by 1; if the subsequence $S_i$ is 10, increase the green value by 3; and if the subsequence $S_i$ is 11, increase the green value by 1). Alternatively, the change could be performed in a pseudo-random fashion. Small changes of this fashion in individual pixels typically result in video and graphic files which should be nearly or totally indistinguishable to a viewer of the file. In video files where the twelve replaced/changed pixels may be spread out over thousands of frames, the change should be even less noticeable. The tradeoff is that the replaced pixels result in the unique user information being embedded in the file. If the file is subsequently decrypted and the plaintext then made publically available, the owner or controller of the content will be able to determine the source of the file.

| PIXEL and COLOR | SUBSEQUENCE of $S_1, \ldots, S_n$ |
| --- | --- |
| (x = 127; y = 12; R = 62; G = 241; B = 197) | $S_1 = 11$ |
| (x = 17; y = 112; R = 68; G = 240; B = 192) | $S_2 = 01$ |
| (x = 227; y = 184; R = 100; G = 119; B = 17) | $S_3 = 00$ |
| (x = 18; y = 96; R = 211; G = 114; B = 97) | $S_4 = 10$ |
| (x = 107; y = 120; R = 129; G = 24; B = 18) | $S_5 = 01$ |
| (x = 63; y = 80; R = 165; G = 20; B = 7) | $S_6 = 00$ |
| (x = 182; y = 85; R = 112; G = 203; B = 251) | $S_7 = 10$ |
| (x = 208; y = 1912; R = 93; G = 165; B = 227) | $S_8 = 11$ |
| (x = 6233; y = 963; R = 18; G = 226; B = 68) | $S_9 = 01$ |
| (x = 7351; y = 858; R = 243; G = 24; B = 226) | $S_{10} = 01$ |
| (x = 1327; y = 1020; R = 62; G = 243; B = 73) | $S_{11} = 10$ |
| (x = 6207; y = 412; R = 105; G = 21; B = 39) | $S_{12} = 11$ |

As was noted above, if a video or graphic is black and white, then the gray scale can be altered in developing the replacement table. It is also the case that, for a text document, characters in the document can be related to as graphic elements as well.

Figure 9:
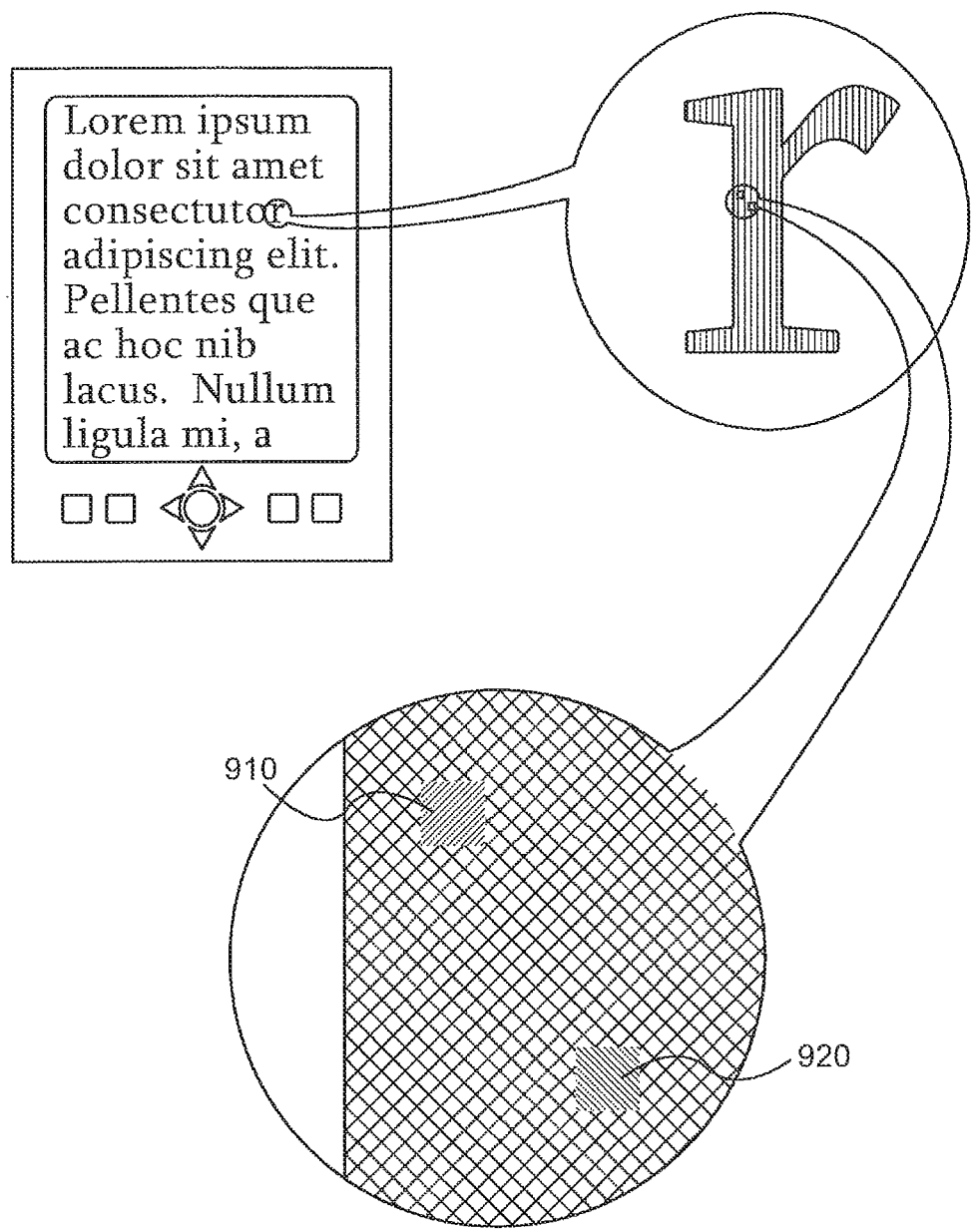
FIG. 9 is a simplified illustration of an alternative of the embodiment of the system of FIG. 8.

Reference is now made to FIG. 9, which is a simplified illustration of an alternative of the embodiment of the system of FIG. 8. In FIG. 9, the character "r" 830 is depicted as appearing, almost, entirely, in one color (typically black). Two of the pixels comprising the character "r" 830, pixel 910 and pixel 920, are depicted as having a different gray scale than the body of character "r" 830. Thus, pixel 910 might have a gray scale of 93%, corresponding to and pixel $S_8=11$; pixel 920, corresponding to $S_6=00$ might have a gray scale of 97%. Such variations in single pixels will typically be either indistinguishable to a reader of the text 810 or will not interfere with the reading of the text 810 displayed on the e-Reader 800.

It is appreciated that although the two pixels pixel 910 and pixel 920 are depicted as appearing in a single character "r" 830, this depiction is merely presented this way as a matter of convenience.

In another example of a possible replacement matrix R, characters could be used. Consider the following three characters:

A
A
A

The first of the three characters appearing above is the character "A", designated in the Unicode standard as Latin capital letter A, having the Unicode value 0041. The second of the three characters appearing above is the character "A", designated in the Unicode standard as Greek capital letter Alpha, having the Unicode value 0391. The third of the three characters appearing above is the character "A", designated in the Unicode standard as Cyrillic capital letter A, having the Unicode value 0410. Similar tables could be produced comprising:

| | | |
| --- | --- | --- |
| B | Latin capital letter B | Unicode 0042 |
| B | Greek capital letter Beta | Unicode 0392 |
| B | Cyrillic capital letter VE | Unicode 0412 | and

| | | |
| --- | --- | --- |
| a | Latin small letter a | Unicode 0061 |
| α | Greek small letter alpha | Unicode 03B1 |
| a | Cyrillic small letter a | Unicode 0430 |

It is appreciated that aside from the Greek small letter alpha, the characters grouped together are indistinguishable to the typical reader. Furthermore, the typical reader would have no trouble reading the phrase "typical reader" correctly.

The concept behind the replacement tables presented above can be extended to other similar but not identical Unicode characters. Consider the following characters:

| | |
| --- | --- |
| A | Unicode 0041 |
| À | Unicode 00C0 |
| Ä | Unicode 00C4 |
| Å | Unicode 00C5 |
| Ã | Unicode 0102 |
| Ą | Unicode 0104 |

Characters presented in the above table may be substituted, using the system presented above, for the character A. A typical reader would have little or no trouble reading a word with such a substitution correctly.

Figure 10:
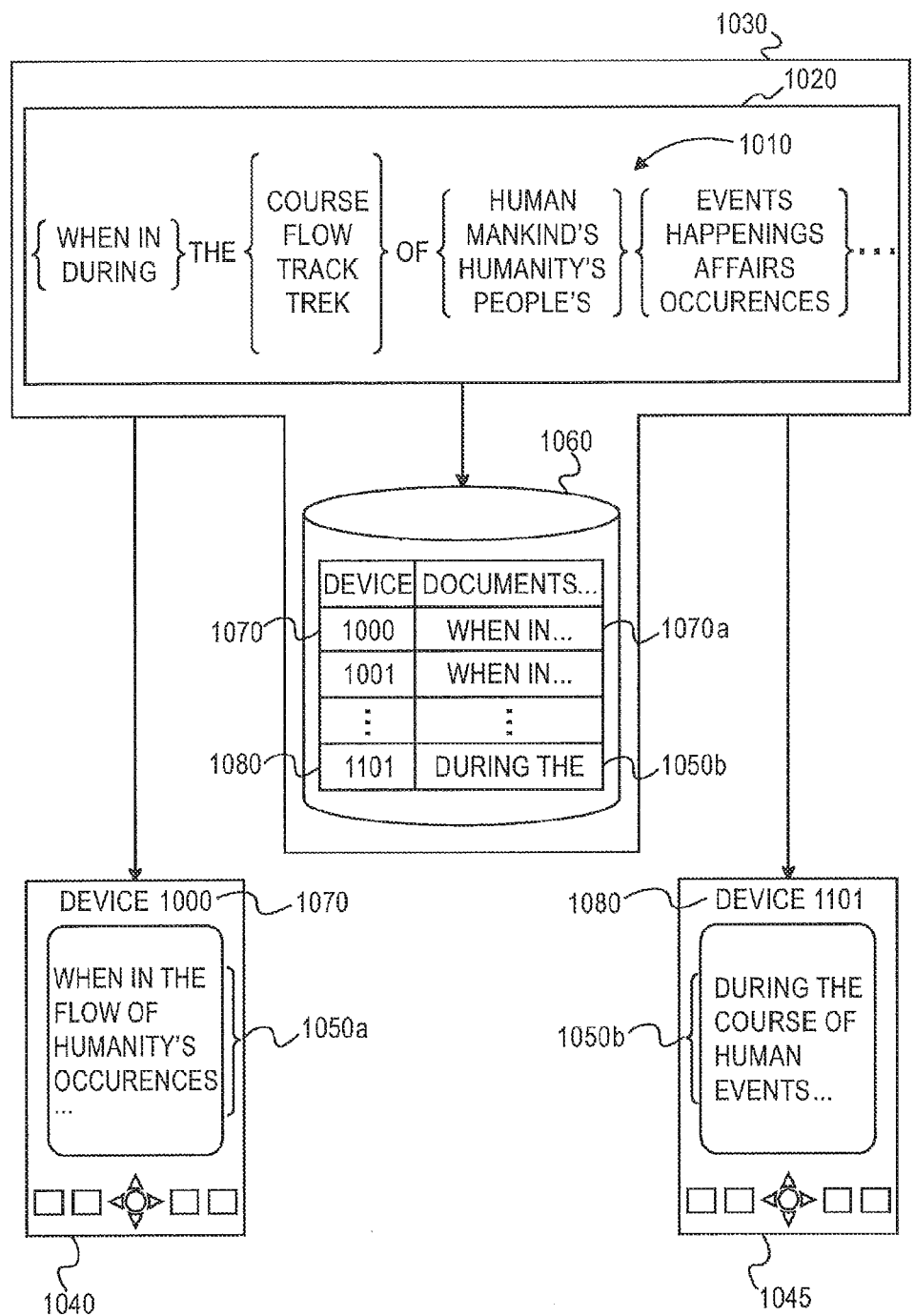
FIG. 10 is a simplified illustration of still another embodiment of a system for protecting content for display on an e-Reader.
Figure 11:
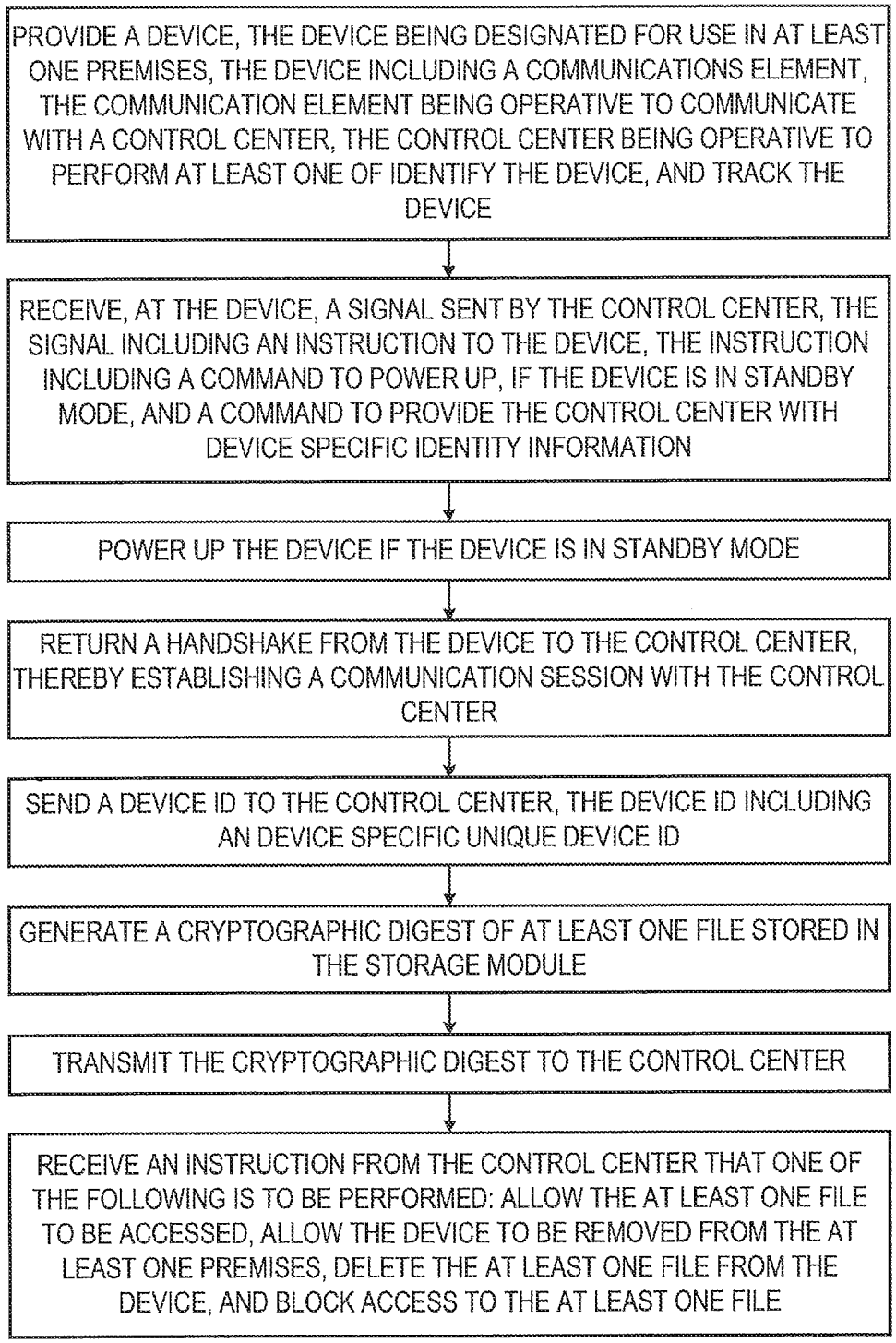
FIGS. 11-15 are simplified flowcharts of preferred methods of operation of the various embodiments described herein.
Figure 12:
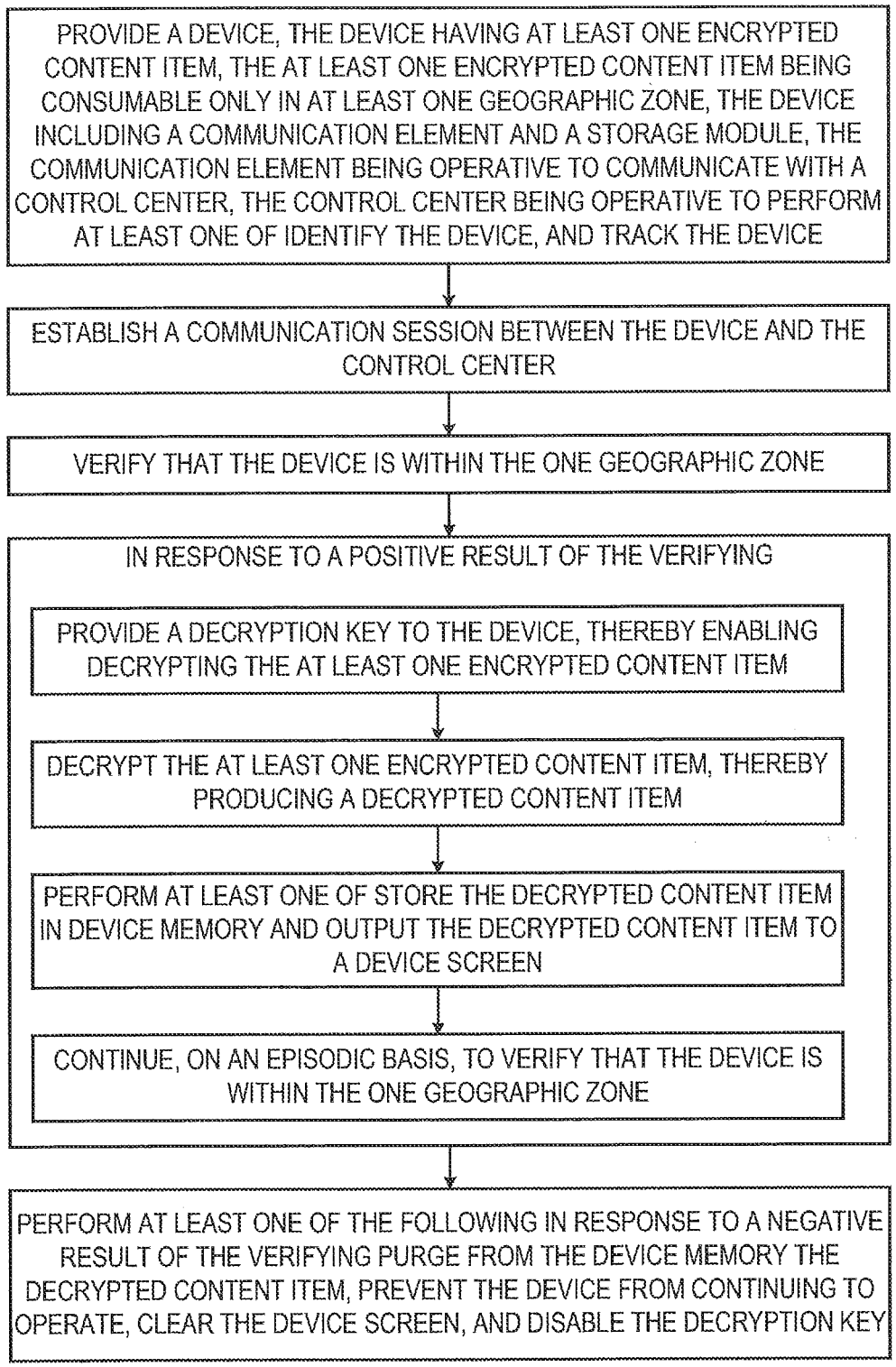
Figure 13:
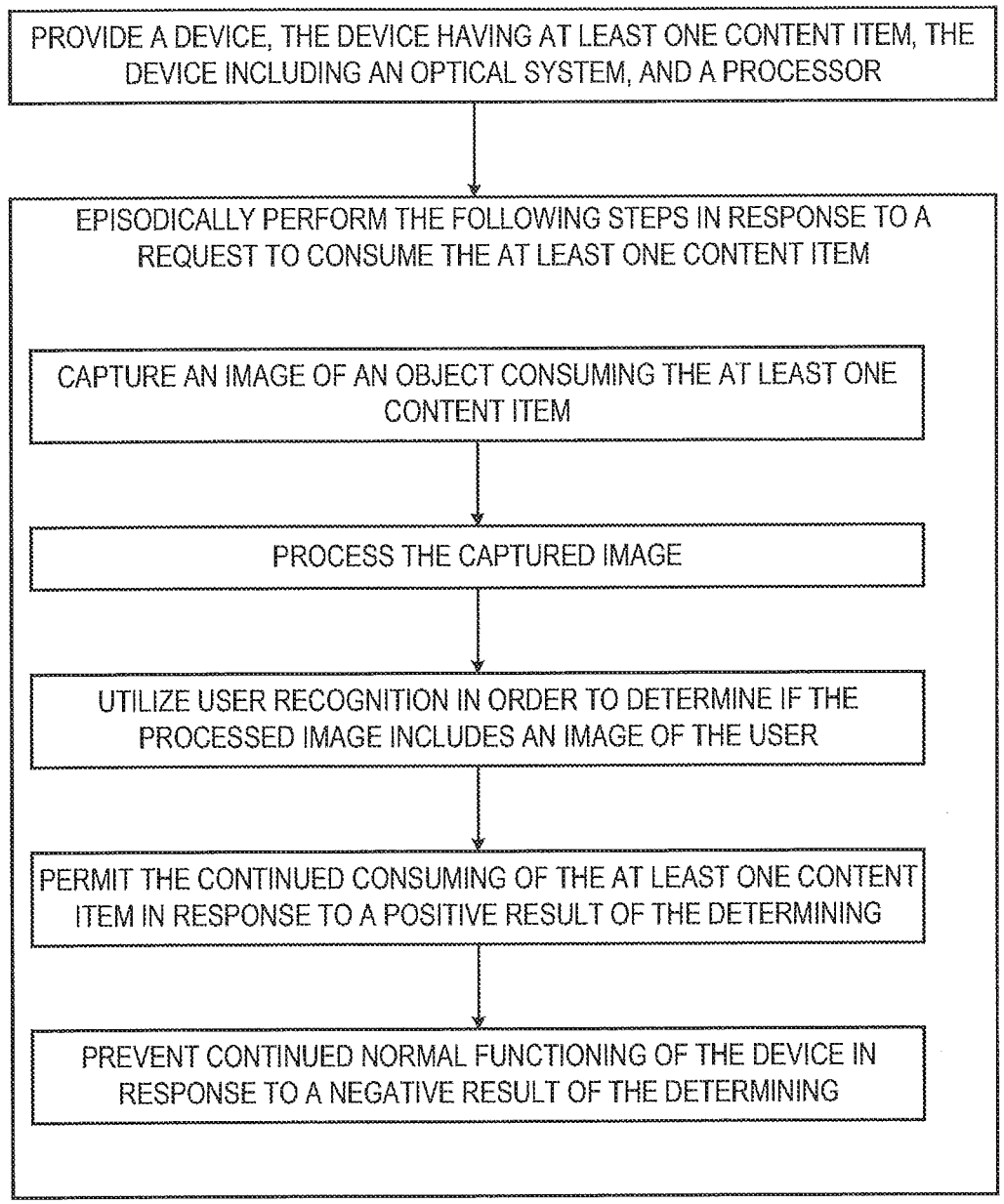
Figure 14:
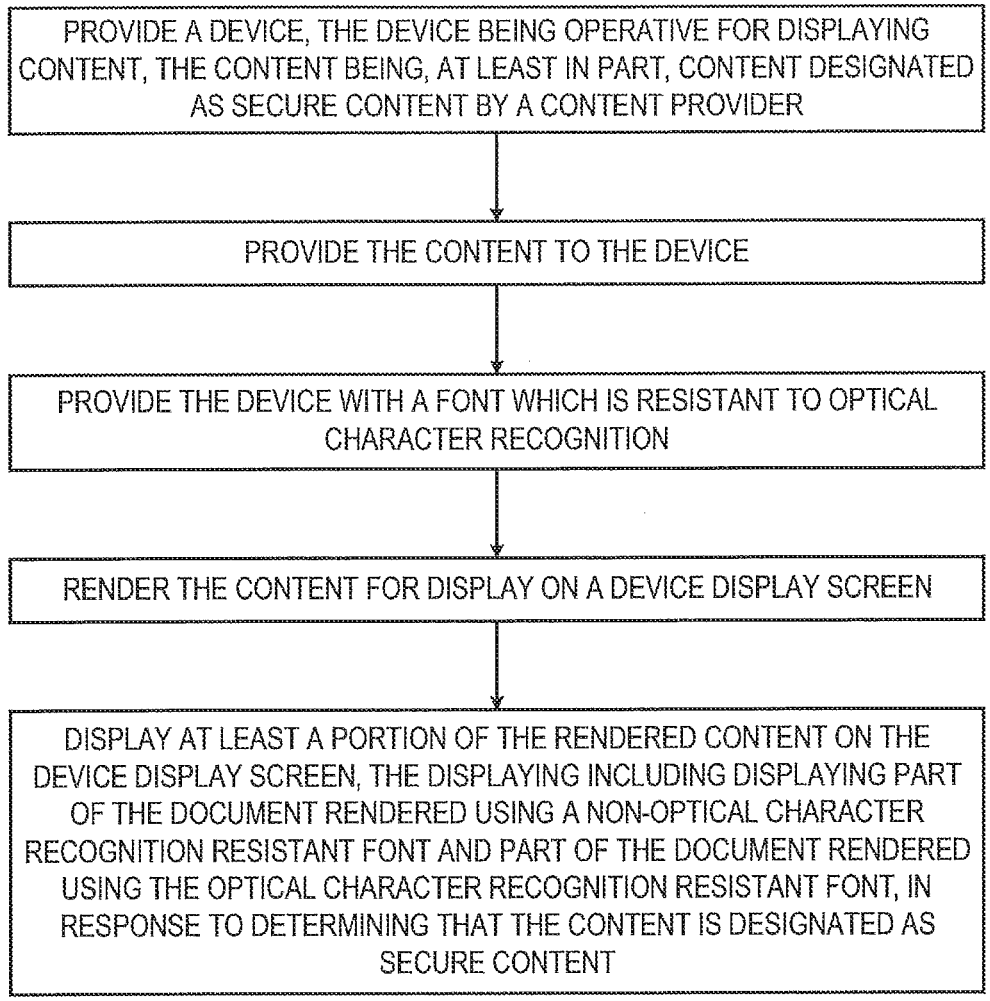
Figure 15:
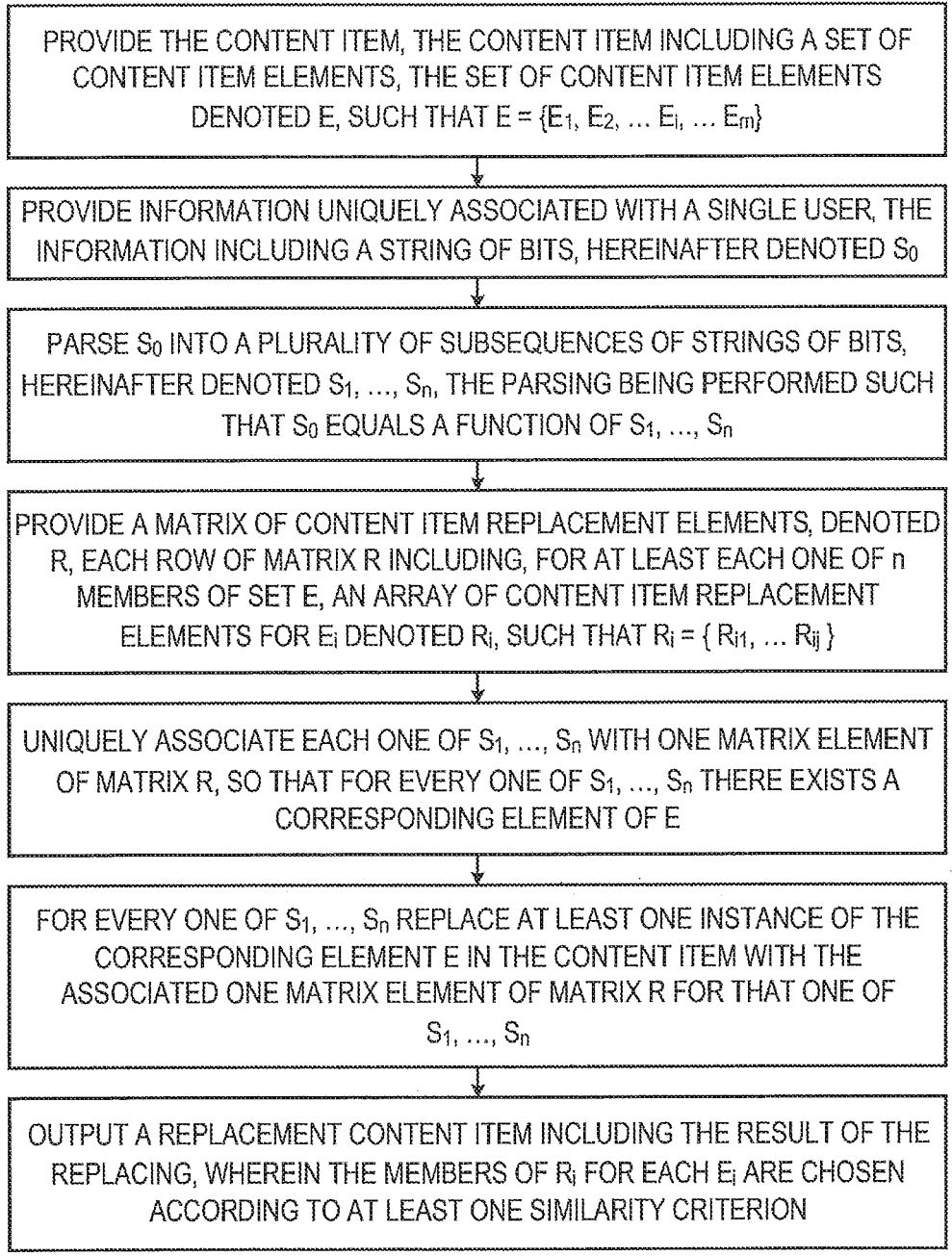

Reference is now made to FIG. 10, which is a simplified illustration of a sixth embodiment of a system for protecting content for display on an e-Reader 1040, 1045. FIG. 10 depicts a system whereby different versions of a document to be displayed on an e-Reader 1040, 1045 are authored so as to produce slightly different versions of the document 1050*a*, 1050*b*. By storing a record of which e-Reader 1040, 1045 receives which version of the document 1050*a*, 1050*b*, it is possible, at a later time, to determine which e-Reader 1040, 1045 is the source of a leak, should one of the versions of the document 1050*a*, 1050*b* be discovered to be leaked. One implementation of such a system is now described.

When authoring the document, the author of the document may suggest synonyms for several words comprised in the document. Alternatively and additionally, alternative spellings of words (for example and without limiting the generality of the foregoing, color/colour; center/centre; program/programme, etc) could be used for several words comprised in the document. Further alternatively and additionally, subtle misspellings may be suggested for some words comprised in the document for example and without limiting the generality of the foregoing, informal/imformal; truly/truely; rescusitate/resuscitate, etc.). Alternatively, grammatical variations may be used, for example and without limiting the generality of the foregoing, commas, semicolons, and colons may be placed or omitted in various places throughout the document. An electronic version of the document 1010, which includes all of the different synonyms, alternative spelling, and misspellings which were proposed by the author of the document, is uploaded to an electronic document authoring system 1020. Each e-Reader 1040, 1045 to which a version of the document is loaded, receives a slightly different version of the document 1050a, 1050b from an electronic document authoring system 1020 management unit 1030.

Each different version of the document 1050a, 1050b, or a cryptographic hash thereof, which is issued to a different e-Reader is stored in a database along with a device ID 1070, 1080.

In such a case, should a suspicious copy of the document be obtained, and it is determined that the copy of the obtained document has been illegally distributed, by comparing the obtained copy of the document (or the cryptographic hash thereof) to the database 1060 of versions of the document 1050a, 1050b, it is possible to determine which e-Reader 1040, 1045 is the source of the illegally distributed version of the document.

In an alternative embodiment of the present invention described in many of the various embodiments of the present invention described herein, different portions of the source document 1010 may be tagged as being available to different levels of security clearances (for example and without limiting the generality of the foregoing, secret, top secret, eyes-only, etc.). If the e-Reader 1040, 1045 to which the an electronic document authoring system 1020 management unit 1030 is to issue the document 1050a, 1050b is not cleared for a certain security level, then only those portions of the document 1050a, 1050b tagged with allowed security levels may be distributed to the e-Reader 1040, 1045.

It is appreciated that the various embodiments of the present invention described herein may be implemented individually in an e-Reader device or in combination with each other. For example and without limiting the generality of the foregoing, the embedded watermark 840 of FIG. 8, or the embedded watermarks 910 and 920 of FIG. 9 may be embedded in a character in the optical character recognition resistant font of FIG. 6 or 7. Similarly, the selectively authored document of FIG. 8 or 9 may be displayed in the optical character recognition resistant font of FIG. 6 or 7, where some letters comprise the embedded watermark 840 of FIG. 8, or the embedded watermarks 910 and 920 of FIG. 9, on an e-Reader device which is operative to detect that the face of the user is directly in line with the display screen, as described above with reference to FIG. 5, and so forth, with implementations of all of the various embodiments of the present invention described herein.

Reference is now made to FIGS. 11-15, which simplified flowcharts of preferred methods of operation of the various embodiments described herein. FIGS. 11-15 are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for fingerprinting a content item, the method comprising:

providing the content item, the content item comprising a set of content item elements, the set of content item elements denoted E, such that $E=\{E_1, E_2, \ldots E_i, \ldots E_m\}$;

providing information uniquely associated with a single user, the information comprising a string of bits, hereinafter denoted $S_0$;

parsing $S_0$ into a plurality of subsequences of strings of bits, hereinafter denoted $S_1, \ldots, S_n$, the parsing being performed such that $S_0$ equals a function of $S_1, \ldots, S_n$;

providing a matrix of content item replacement elements, the matrix denoted R, each row of matrix R comprising, for at least each one of n members of set E, an array of content item replacement elements for $E_i$ denoted $R_i$, such that $R_i=\{R_{i1}, \ldots R_{ij}\}$;

uniquely associating, by a processor, each one of the possible combinations of subsequences for each of $S_1, \ldots, S_n$ with one matrix element of matrix R, so that for every one of the possible combination of subsequences of bits and for each $S_1, \ldots, S_n$ there exists a corresponding element of E;

for every one of $S_1, \ldots, S_n$ replacing at least one instance of the corresponding element E in the content item with the associated one matrix element of matrix R for the corresponding one of $S_1, \ldots, S_n$; and outputting a replacement content item comprising the result of the replacing, wherein the members of $R_i$ for each $E_i$ are chosen according to at least one criterion of similarity to the content item $E_i$ to be replaced.

2. The method of claim 1 and also comprising storing a record indicating which matrix element of matrix R replaces which subsequence of $S_1, \ldots, S_n$.

3. The method according to claim 1 and wherein the choosing according to a similarity criterion comprises choosing from a table.

4. The method according to claim 3 and wherein the table comprises a plurality of Unicode characters.

5. The method according to claim 3 and wherein the table comprises a plurality of colors.

6. The method according to claim 3 and wherein the table comprises a plurality of gray scale levels.

7. The method according to claim 1 and wherein the content item comprises a text based content item.

8. The method according to claim 7 and wherein the $E_i$ comprised in the text based content item comprises a Unicode character.

9. The method according to claim 7 and wherein the $E_i$ comprised in the text based content item comprises at least one pixel displayed in one character.

10. The method according to claim 1 wherein the content item comprises a graphic content item.

11. The method according to claim 10 and wherein the $E_i$ comprised in the graphic content item comprises at least one pixel.

12. The method according to claim 1 and wherein the content item comprises a sound based content item.

13. The method according to claim 1 and wherein the content item comprises a video based content item.

14. The method according to claim 13 and wherein the $E_i$ comprised in the video based content item comprises at least one pixel.

15. A system for fingerprinting a content item, the system comprising:
- a content item comprising a set of content item elements, the set of content item elements denoted E, such that $E=\{E_1, E_2, \ldots E_i, \ldots E_m\}$;
- information uniquely associated with a single user, the information comprising a string of bits, hereinafter denoted $S_0$;
- a parser operative to parse $S_0$ into a plurality of subsequences of strings of bits, hereinafter denoted $S_1, \ldots, S_n$, the parsing being performed such that $S_0$ equals a function of $S_1, \ldots, S_n$;
- a matrix of content item replacement elements, the matrix denoted R, each row of matrix R comprising, for at least each one of n members of set E, an array of content item replacement elements for $E_i$ denoted $R_i$, such that $R_i=\{R_{i1}, \ldots R_{ij}\}$;
- a processor which uniquely associates each one of the possible combinations of subsequences for each of $S_1, \ldots, S_n$ with one matrix element of matrix R, so that for every one of the possible combination of subsequences of bits and for each $S_1, \ldots, S_n$ there exists a corresponding element of E;
- a replacer, operative to replace, for every one of $S_1, \ldots, S_n$, at least one instance of the corresponding element E in the content item with the associated one matrix element of matrix R for corresponding one of $S_1, \ldots, S_n$; and
- a replacement content item outputting unit which outputs a replacement content item comprising the result of the replacing,
- wherein the members of $R_i$ for each $E_i$ are chosen according to at least one criterion of similarity to the content item $E_i$ to be replaced.

16. A system for fingerprinting a content item, the system comprising:
- means for providing the content item, the content item comprising a set of content item elements, the set of content item elements denoted E, such that $E=\{E_1, E_2, \ldots E_i, \ldots E_m\}$;
- means for providing information uniquely associated with a single user, the information comprising a string of bits, hereinafter denoted $S_0$;
- means for parsing $S_0$ into a plurality of subsequences of strings of bits, hereinafter denoted $S_1, \ldots, S_n$, the parsing being performed such that $S_0$ equals a function of $S_1, \ldots, S_n$;
- means for providing a matrix of content item replacement elements, the matrix denoted R, each row of matrix R comprising, for at least each one of n members of set E, an array of content item replacement elements for $E_i$ denoted $R_i$, such that $R_i=\{R_{i1}, \ldots R_{ij}\}$;
- means for uniquely associating each one of the possible combinations of subsequences for each of $S_1, \ldots, S_n$ with one matrix element of matrix R, so that for every one of the possible combination of subsequences of bits and for each $S_1, \ldots, S_n$ there exists a corresponding element of E;
- for every one of $S_1, \ldots, S_n$ means for replacing at least one instance of the corresponding element E in the content item with the associated one matrix element of matrix R for the corresponding one of $S_1, \ldots, S_n$; and
- means for outputting a replacement content item comprising the result of the replacing,
- wherein the members of $R_i$ for each $E_i$ are chosen according to at least one criterion of similarity to the content item $E_i$ to be replaced.

* * * * *

UNITED STATES PATENT AND TRADEMARK OFFICE
CERTIFICATE OF CORRECTION

PATENT NO.        : 8,791,788 B2  
APPLICATION NO.   : 13/384687  
DATED             : July 29, 2014  
INVENTOR(S)       : Zucker et al.

Page 1 of 1

It is certified that error appears in the above-identified patent and that said Letters Patent is hereby corrected as shown below:

In the Specification

In column 12, line 64, delete "and )" and substitute therefor --and ⁻ )--.

In column 18, line 33, delete "phrase "typical reader" correctly." and substitute therefor --phrase "typicαl reader" correctly.--.

Signed and Sealed this  
Fourth Day of November, 2014

Michelle K. Lee  
*Deputy Director of the United States Patent and Trademark Office*